(12) United States Patent
Ahn

(10) Patent No.: US 7,656,500 B2
(45) Date of Patent: *Feb. 2, 2010

(54) LIQUID CRYSTAL DISPLAY DEVICE AND FABRICATING METHOD THEREOF

(75) Inventor: Byung Chul Ahn, Anyang-shi (KR)

(73) Assignee: LG Display Co., Ltd., Seoul (KR)

( * ) Notice: Subject to any disclaimer, the term of this patent is extended or adjusted under 35 U.S.C. 154(b) by 614 days.

This patent is subject to a terminal disclaimer.

(21) Appl. No.: 11/312,593

(22) Filed: Dec. 21, 2005

(65) Prior Publication Data

US 2006/0139552 A1 Jun. 29, 2006

(30) Foreign Application Priority Data

Dec. 24, 2004 (KR) ........................ 10-2004-0112577

(51) Int. Cl.
  G02F 1/1339 (2006.01)
  G02F 1/1343 (2006.01)
  G02F 1/1345 (2006.01)
(52) U.S. Cl. .................. 349/190; 349/147; 349/149
(58) Field of Classification Search .................. 349/147, 349/153, 141, 149, 38, 190
See application file for complete search history.

(56) References Cited

U.S. PATENT DOCUMENTS

| 6,338,989 B1 * | 1/2002 | Ahn et al. ............ 438/158 |
| 7,348,198 B2 * | 3/2008 | Ahn ..................... 438/30 |
| 7,489,379 B2 * | 2/2009 | Ahn et al. ............ 349/139 |

* cited by examiner

*Primary Examiner*—Mike Qi
(74) *Attorney, Agent, or Firm*—McKenna Long & Aldridge LLP

(57) ABSTRACT

A liquid crystal display device and a fabricating method having a simplified process are disclosed. The liquid crystal display device compromises, among other features, first and second substrates, a gate line crossing a data line with a gate insulating film therebetween to define a pixel area. A common line is provided on the substrate substantially parallel to the gate line, and a common electrode is extended from the common line into the pixel area. A pixel electrode is extended from a drain electrode into the pixel area to form a horizontal electric field with the common electrode. The data line, a source electrode, a drain electrode and the pixel electrode are formed of a first conductive layer group having at least double conductive layers, and are formed in an area to be sealed by a sealant upon joining the first and second substrates.

14 Claims, 22 Drawing Sheets

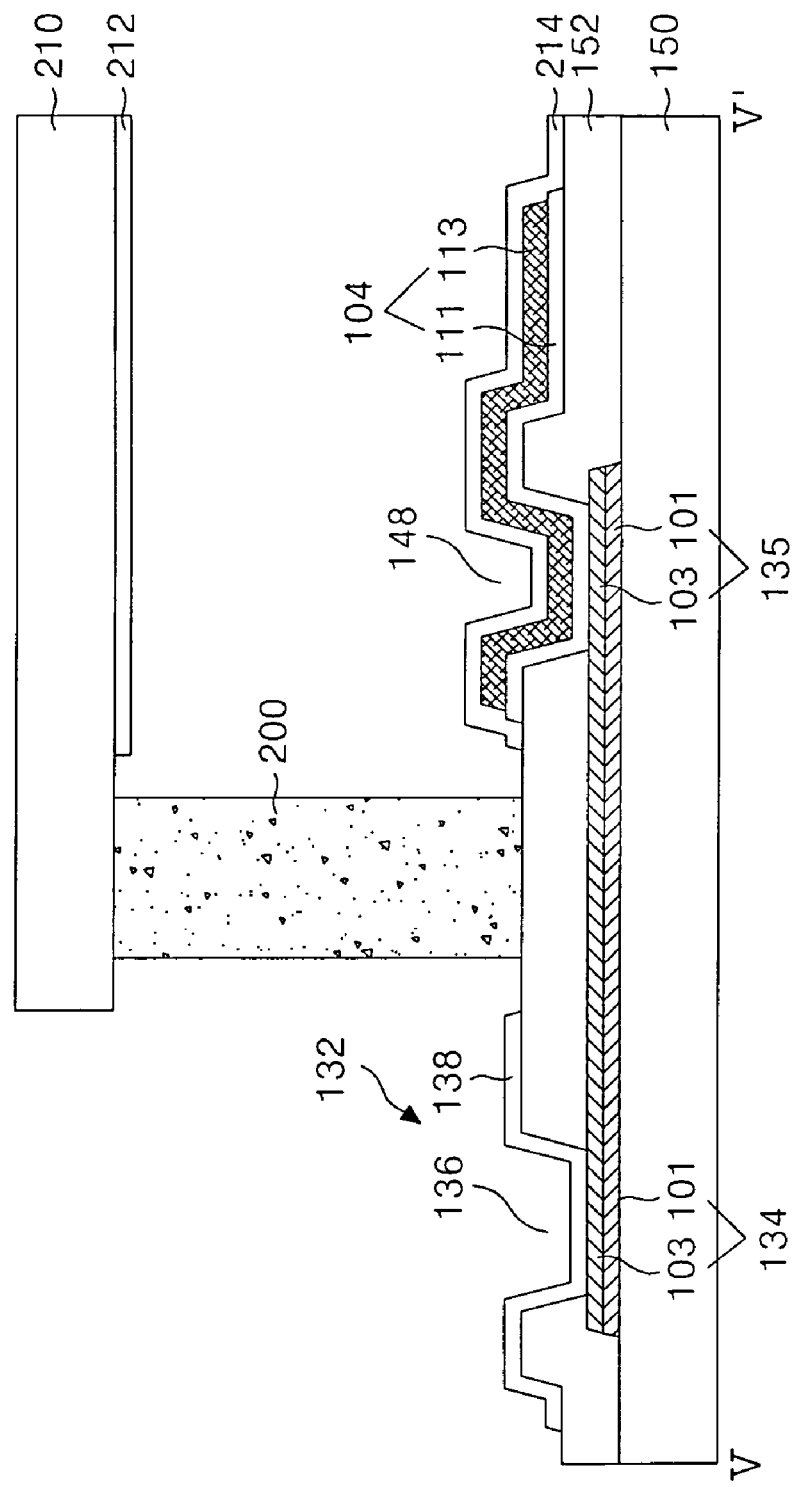

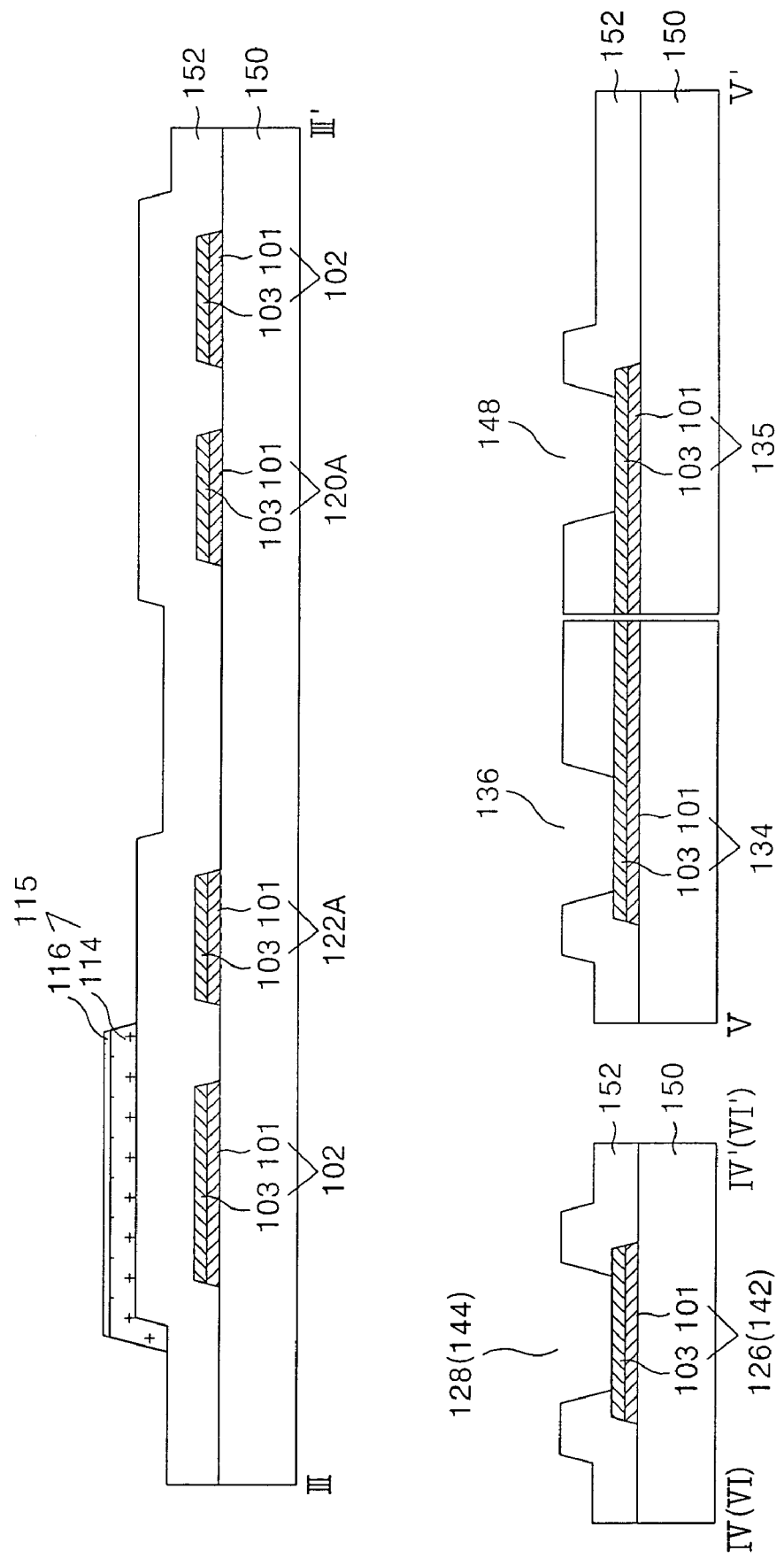

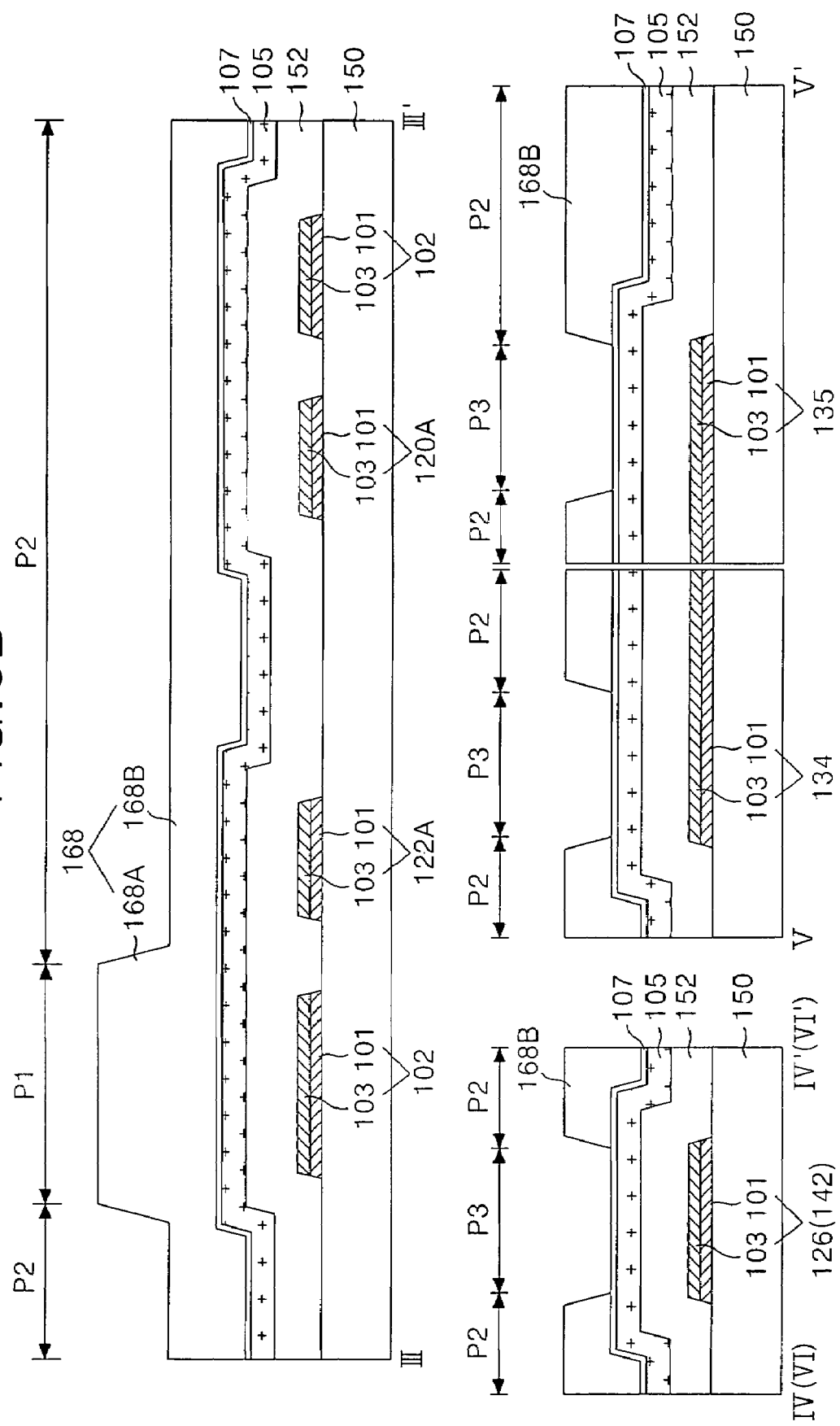

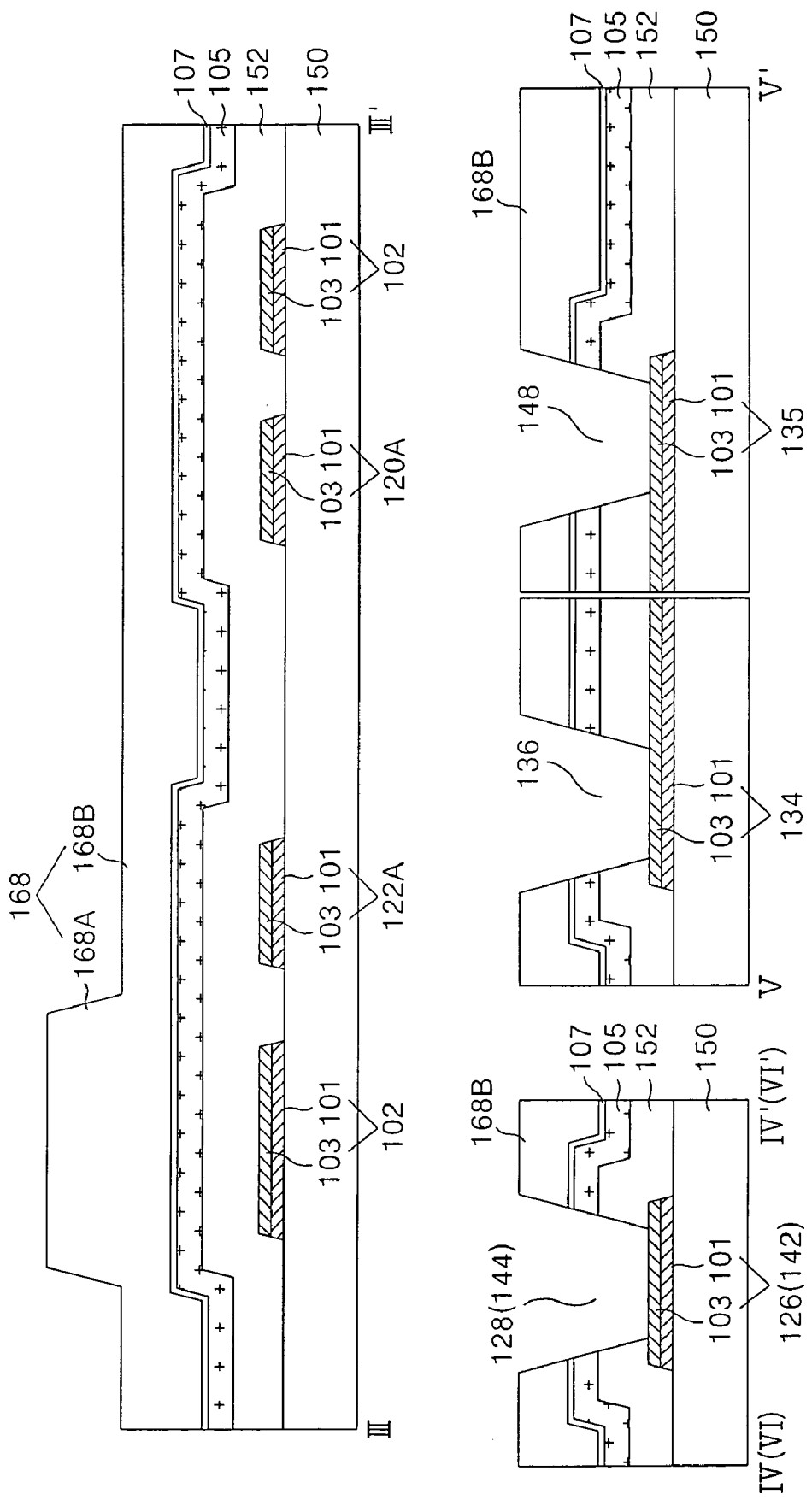

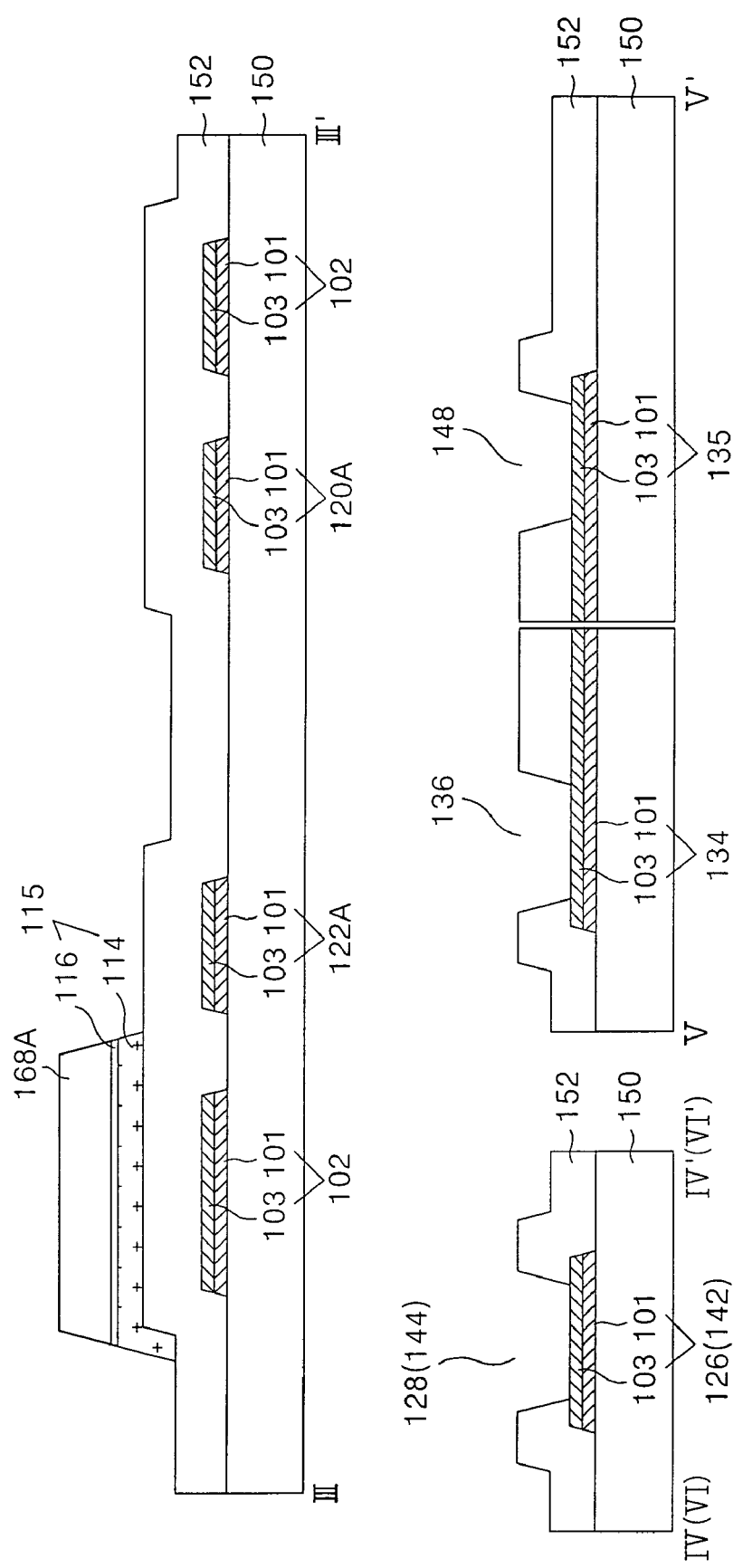

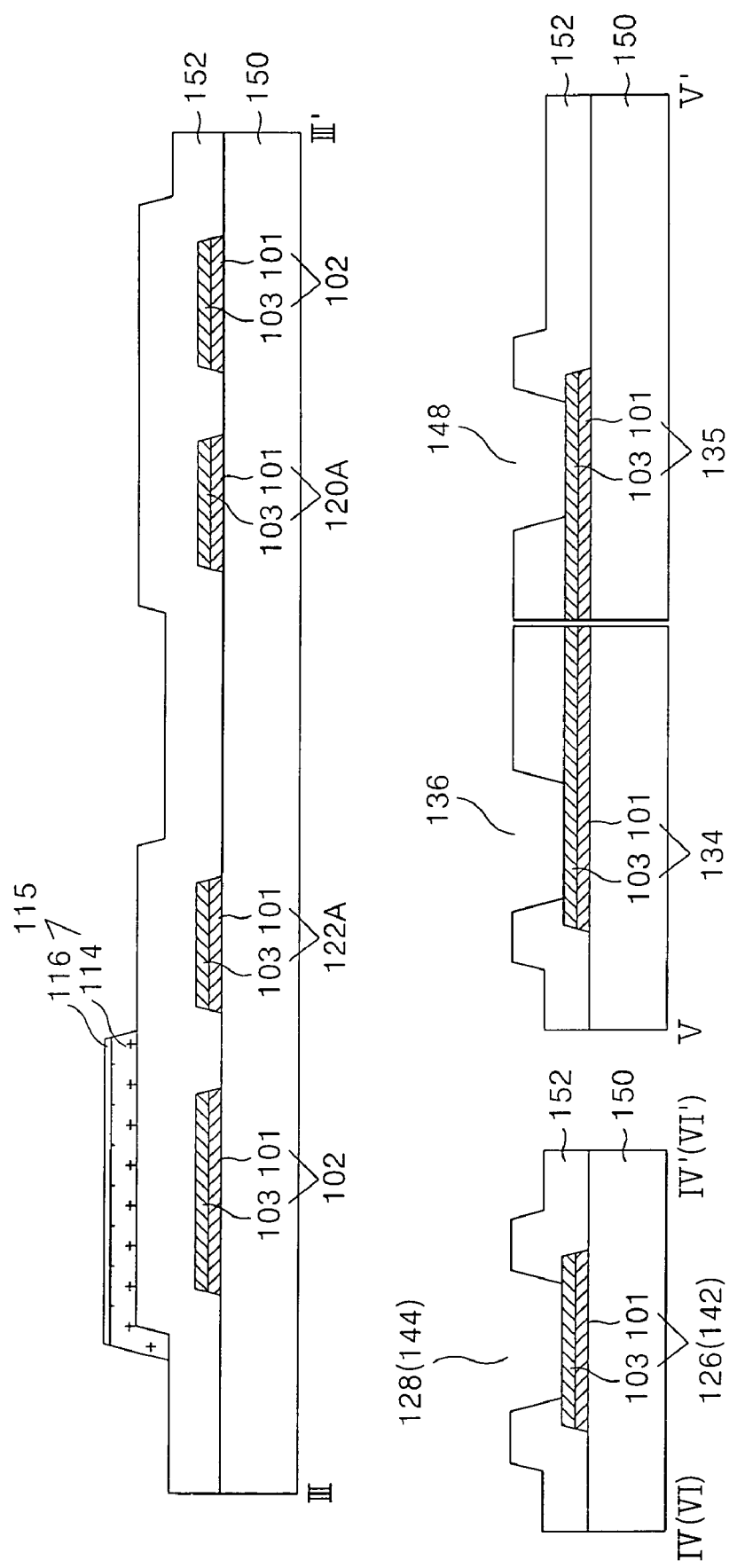

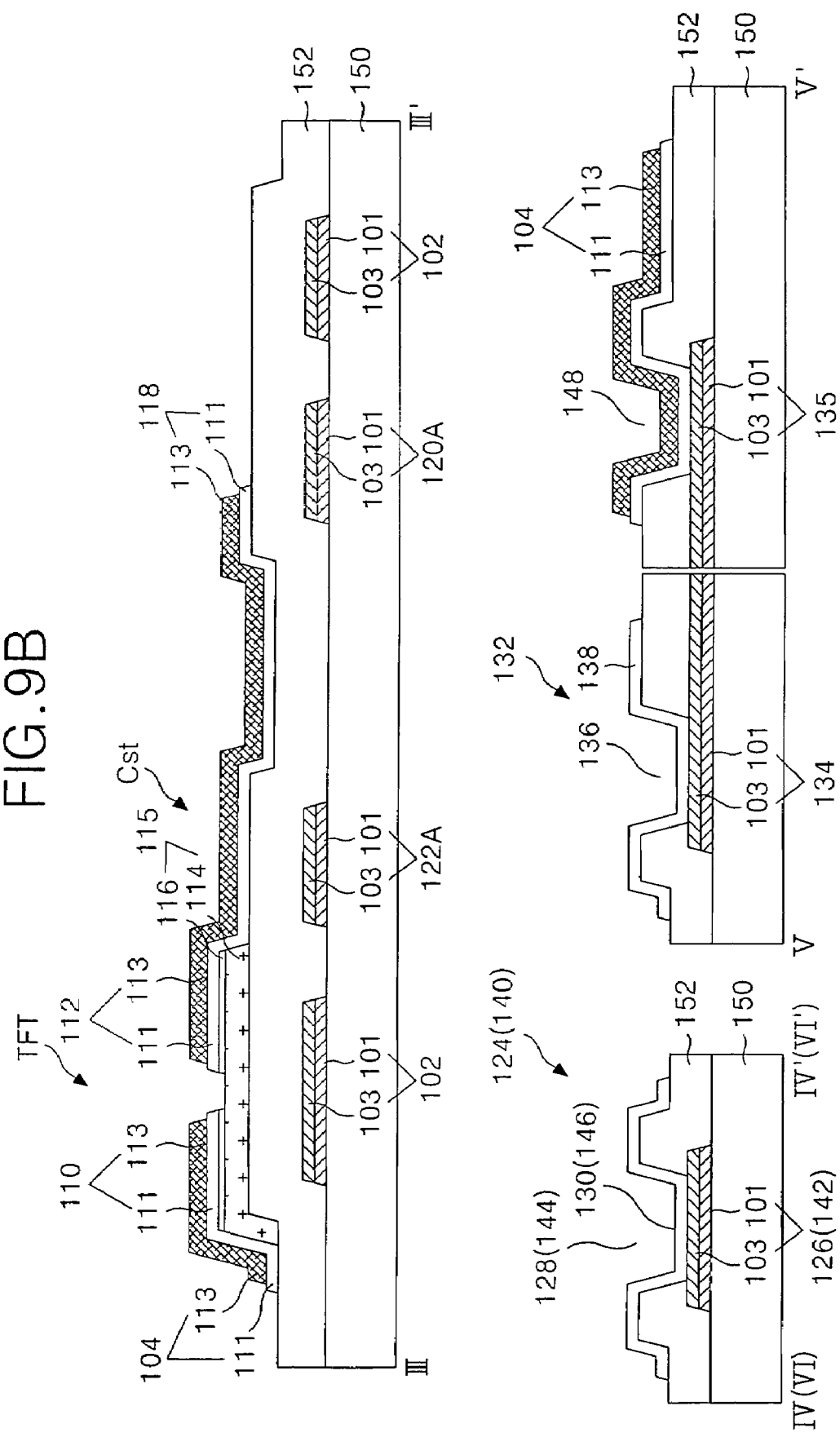

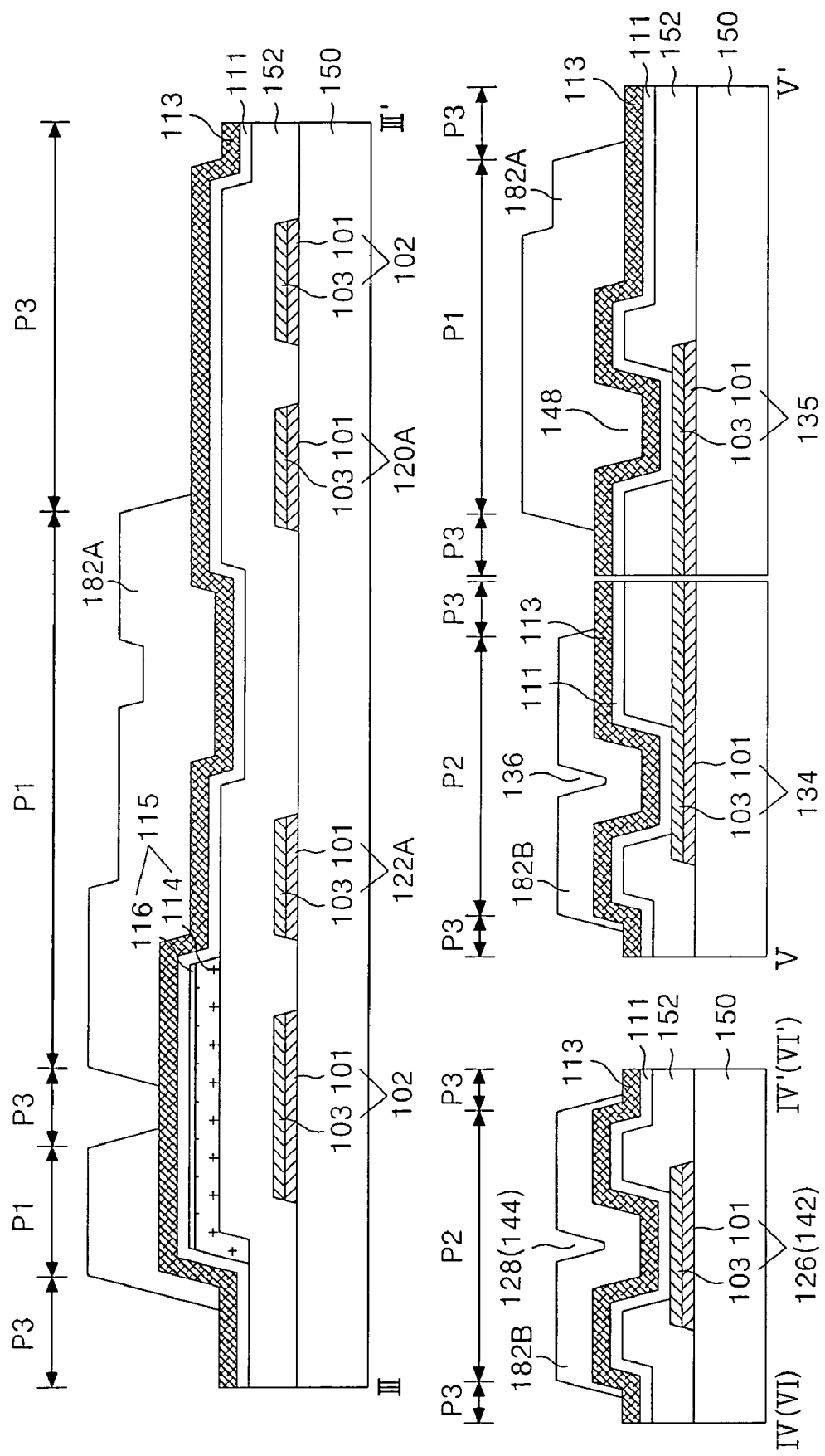

LIQUID CRYSTAL DISPLAY DEVICE AND FABRICATING METHOD THEREOF

This application claims the benefit of Korean Patent Application No. P2004-112577 filed in Korea on Dec. 24, 2004, which is hereby incorporated by reference for all purposes as if fully set forth herein.

BACKGROUND OF THE INVENTION

1. Field of the Invention

This invention relates to a liquid crystal display device using a horizontal electric field, and more particularly to a thin film transistor substrate of a horizontal electric field applying type and a fabricating method thereof that simplify a process.

2. Discussion of the Related Art

Generally, a liquid crystal display (LCD) controls light transmittance of a liquid crystal having a dielectric anisotropy using an electric field to display a picture. To this end, the LCD includes a liquid crystal display panel for displaying a picture by a liquid crystal cell matrix, and a driving circuit for driving the liquid crystal display panel.

In FIG. 1, a related art liquid crystal display panel is comprised of a color filter substrate 10 and a thin film transistor substrate 20 that are joined together with a liquid crystal 24 therebetween.

The color filter substrate 10 includes a black matrix 4, a color filter 6 and a common electrode 8 that are sequentially provided on an upper glass substrate 2. The black matrix 4 is provided in a matrix type on the upper glass substrate 2. The black matrix 4 divides an area of the upper glass substrate 2 into a plurality of cell areas to be provided with the color filter 6, and prevents a light interference between adjacent cells and an external light reflection. The color filter 6 is provided at the cell area divided by the black matrix 4 in such a manner to be divided into red(R), green(G) and blue(B) areas. Thus, transmitting red, green and blue lights. The common electrode 8 is formed of a transparent conductive layer formed entirely on the color filter 6, and supplies a common voltage Vcom that serves as a reference voltage upon driving of the liquid crystal 24. Further, an over-coat layer (not shown) for smoothing the color filter 6 may be provided between the color filter 6 and the common electrode 8.

The thin film transistor substrate 20 includes a thin film transistor 18 and a pixel electrode 22 provided for each cell area defined by a crossing of a gate line 14 and a data line 16 at a lower glass substrate 12. The thin film transistor 18 applies a data signal from the data line 16 to the pixel electrode 22, in response to a gate signal from the gate line 14. The pixel electrode 22, formed of a transparent conductive layer, supplies the data signal from the thin film transistor 18 to drive the liquid crystal 24.

The liquid crystal 24 having a dielectric anisotropy is rotated in accordance with an electric field formed by the data signal from the pixel electrode 22 and a common voltage Vcom from the common electrode 8 to control light transmittance, thereby implementing a gray scale level.

Further, a liquid crystal display panel includes a spacer (not shown) for uniformly maintaining a cell gap between the color filter substrate 10 and the thin film transistor substrate 20.

In the liquid crystal display panel, the color filter substrate 10 and the thin film transistor substrate 20 are formed by a plurality of mask processes. Herein, one mask process includes many processes such as thin film deposition (coating), cleaning, photolithography, etching, photo-resist stripping and inspection processes.

Particularly, because the thin film transistor substrate includes a semiconductor process and requires a plurality of mask processes, it has a complicated fabricating process which is a major factor in the increased manufacturing costs of the liquid crystal display panel. Therefore, a thin film transistor substrate has been developed to reduce the number of mask process from a five-round mask process that is a standard mask process.

Liquid crystal displays are largely classified into a vertical electric field applying type and a horizontal electric field applying type based upon with a direction of the electric field driving the liquid crystal.

The liquid crystal display of a vertical electric field applying type drives a liquid crystal in a twisted nematic (TN) mode with a vertical electric field formed between a pixel electrode and a common electrode arranged opposite to each other on the upper and lower substrates. The liquid crystal display of a vertical electric field applying type has an advantage of a large aperture ratio, while having a drawback of a narrow viewing angle of about 90°.

The liquid crystal display of a horizontal electric field applying type drives a liquid crystal in an in-plane switching (IPS) mode with a horizontal electric field between the pixel electrode and the common electrode arranged in parallel to each other on the lower substrate. The liquid crystal display of a horizontal electric field applying type has an advantage of a wide viewing angle of about 160°.

The thin film transistor substrate in the liquid crystal display of a horizontal electric field applying type also requires a plurality of mask processes which is a drawback of a complicated fabricating process. Therefore, in order to reduce the manufacturing costs, it is necessary to reduce the number of mask processes.

SUMMARY OF THE INVENTION

Accordingly, the present invention is directed to a liquid crystal display device that substantially obviates one or more of the problems due to limitations and disadvantages of the related art. An advantage of the present invention is to provide a thin film transistor substrate of a horizontal electric field applying type and a fabricating method thereof that simplify a process.

Additional features and advantages of the invention will be set forth in the description which follows, and in part will be apparent from the description, or may be learned by practice of the invention. These and other advantages of the invention may be realized and attained by the structure particularly pointed out in the written description and claims hereof as well as the appended drawings.

To achieve these and other advantages and in accordance with the purpose of the invention, the liquid crystal display device according to one aspect of the present invention comprises first and second substrates; a gate line on the first substrate; a data line crossing the gate line with a gate insulating film therebetween to define a pixel area; a thin film transistor including a gate electrode connected to the gate line, a source electrode connected to the data line, a drain electrode opposite the source electrode and a semiconductor pattern defining a channel between the source electrode and the drain electrode; a common line on the first substrate substantially parallel to the gate line; a common electrode extended from the common line into the pixel area; and a pixel electrode extended from the drain electrode into the pixel area to form a horizontal electric field with the common electrode, wherein the data line, the source electrode, the drain electrode and the pixel electrode are formed of a first conductive layer group having at least double conductive layers, and are formed in an area to be sealed by a sealant upon joining the first and second substrates.

In another embodiment, a method of fabricating a liquid crystal display device comprises a first mask process of forming a first mask pattern group including a gate line, a gate electrode connected to the gate line, a common line substantially parallel to the gate line and a common electrode connected to the common line on a first substrate; a second mask process of forming a gate insulating film on the first mask pattern group and forming a semiconductor pattern on the gate insulating film; and a third mask process of forming a third mask pattern group including a data line crossing the gate line and the common line, a source electrode connected to the data line, a drain electrode opposite the source electrode and a pixel electrode connected to the drain electrode from a first conductive layer group having at least double conductive layers on the gate insulating film, wherein the third mask pattern group is formed in an area to be sealed by a sealant upon joining the first substrate and a second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principals of the invention.

In the drawings:

FIG. 5 is a sectional view showing a data pad area of a liquid crystal display panel employing the thin film transistor substrate of a horizontal electric field applying type shown in FIG. 3;

FIG. 7a and FIG. 7b are a plan view and a sectional view explaining a second mask process in a method of fabricating the thin film transistor substrate of a horizontal electric field applying type according to the embodiment of the present invention, respectively;

FIG. 8a to FIG. 8f are sectional views more specifically explaining the second mask process;

FIG. 9a and FIG. 9b are a plan view and a sectional view explaining a third mask process in a method of fabricating the thin film transistor substrate of a horizontal electric field applying type according to the embodiment of the present invention, respectively; and FIG. 10a to FIG. 10e are sectional views more specifically explaining the third mask process.

DETAILED DESCRIPTION OF THE ILLUSTRATED EMBODIMENTS

Reference will now be made in detail to embodiments of the present invention, examples of which are illustrated in the accompanying drawings.

Figure 1:
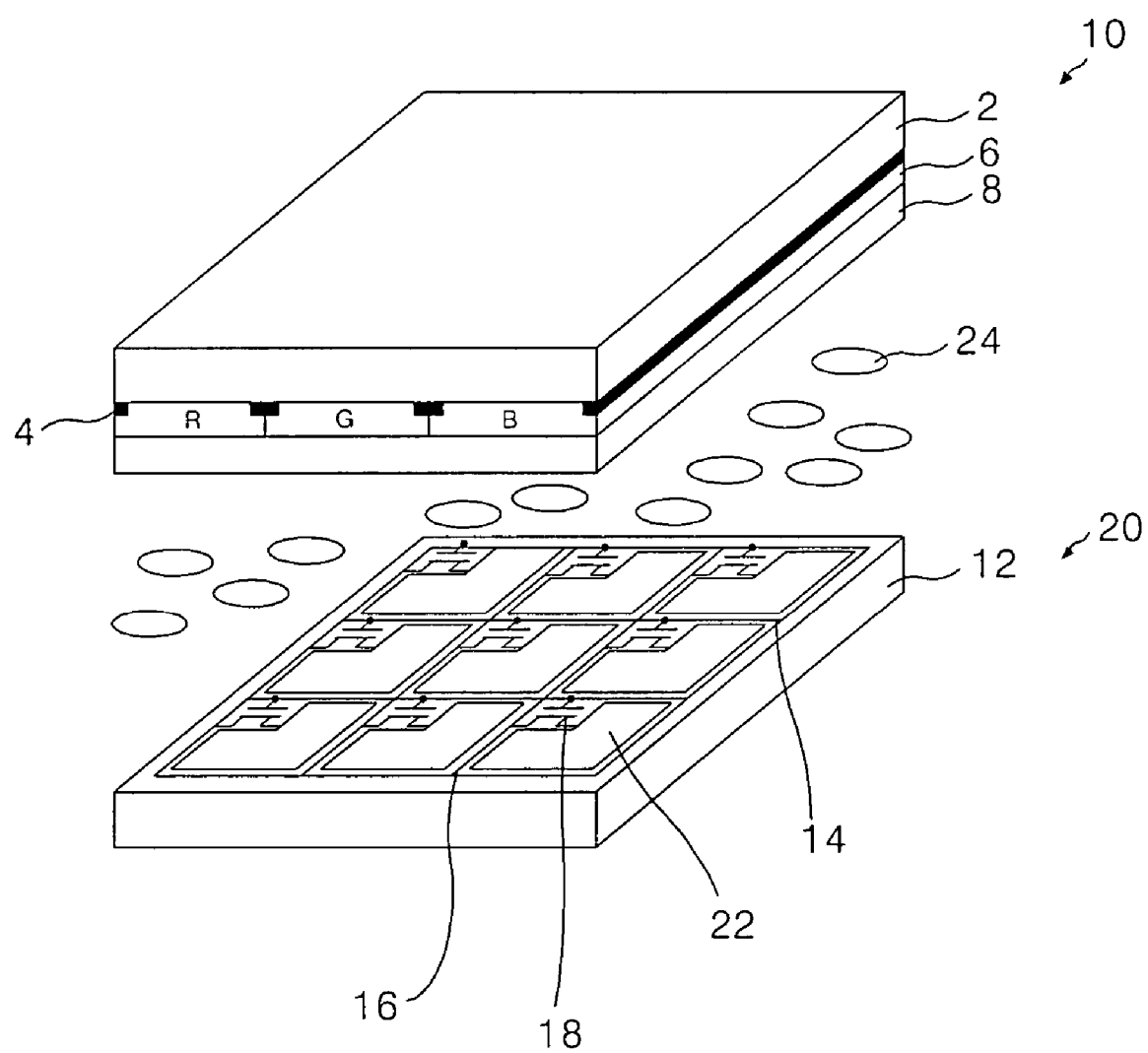
FIG. 1 is a schematic perspective view showing a structure of a related art liquid crystal display panel.
Figure 2:
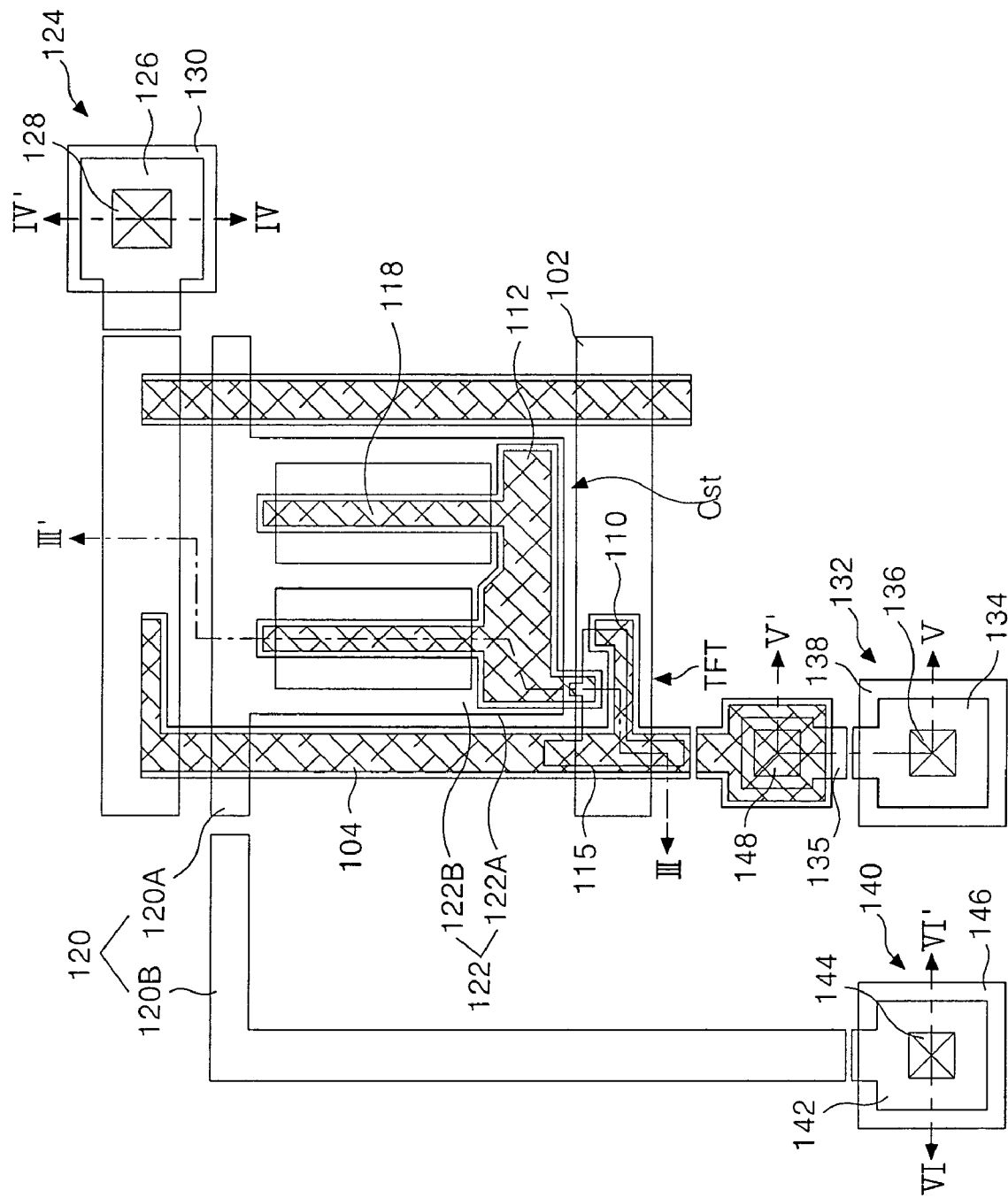
FIG. 2 is a plan view showing a structure of a thin film transistor substrate of horizontal electric field applying type according to an embodiment of the present invention.
Figure 3:
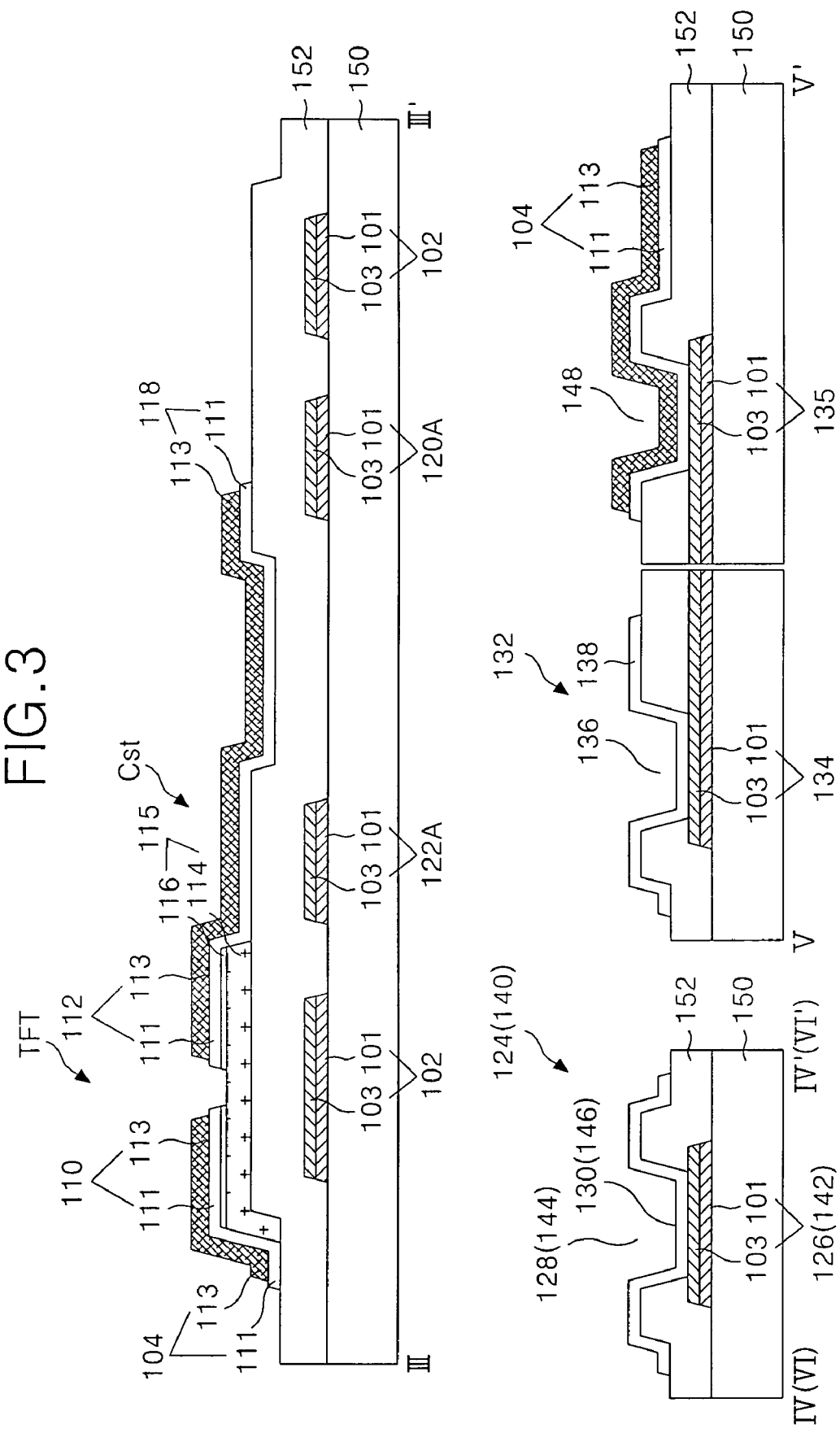
FIG. 3 is a sectional view of the thin film transistor substrate of a horizontal electric field applying type taken along III-III', IV-IV', V-V' and VI-VI' lines in FIG. 2.

FIG. 2 is a plan view showing a structure of a thin film transistor substrate of a horizontal electric field applying type according to an embodiment of the present invention, and FIG. 3 is a section view of the thin film transistor substrate taken along III-III', IV-IV', V-V' and VI-VI' lines in FIG. 2.

Referring to FIG. 2 and FIG. 3, the thin film transistor substrate of a horizontal electric field applying type includes a gate line 102 and a data line 104 provided on a lower substrate 150 in such a manner to cross each other with a gate insulating film 152 therebetween and define a pixel area, a thin film transistor TFT connected to the gate line 102, the data line 104, a pixel electrode 118, the pixel electrode 118 and a common electrode 122 provided to form a horizontal electric field at said pixel area, a common line 120 connected to the common electrode 122, and a storage capacitor Cst provided at an overlapping portion between the common electrode 122 and a drain electrode 112. Further, the thin film transistor substrate includes a gate pad 124 connected to the gate line 102, a data pad 132 connected to the data line 104, and a common pad 140 connected to the common line 120.

The gate line 102 supplies a scanning signal from a gate driver (not shown), while the data line 104 supplies a video signal from a data driver (not shown). The gate line 102 and the data line 104 cross each other with the gate insulating film 152 therebetween to define the pixel area.

The gate line 102 is formed on the substrate 150 in a multiple-layer structure having at least double metal layers. For instance, as shown FIG. 3, the gate line 102 has a double-layer structure including a first conductive layer 101 employing a low-resistance metal such as Al and a second conductive layer 103 employing a metal capable of reducing a contact resistance against the transparent conductive layer such as Mo. The data line 104 is formed on the gate insulating film 152 in a multiple-layer structure in which at least double layers including the transparent conductive layer are built. For example, as shown FIG. 5, the data line 104 has a double-layer structure in which a third conductive layer 111 employing a transparent conductive layer or an opaque metal having a strong corrosion resistance and a high strength such as Ti or W, etc and a fourth conductive layer 113 employing a metal are formed.

The thin film transistor TFT allows a video signal applied to the data line 104 to be charged into the pixel electrode 118 and be maintained in response to a scanning signal applied to the gate line 102. To this end, the thin film transistor includes a gate electrode extended from the gate line 102, a source electrode 110 connected to the data line 104, a drain electrode 112 positioned opposite the source electrode 110 to be connected to the pixel electrode 118, an active layer 114 overlapping the gate line 102 with the gate insulating film 152 therebetween to provide a channel between the source electrode 110 and the drain electrode 112, and an ohmic contact layer 116 formed on the active layer 114 in an area other than the channel portion to make an ohmic contact with the source electrode 110 and the drain electrode 112. Herein, the source electrode 110 and the drain electrode 112 have a double-layer structure in which the third and fourth conductive layers 111 and 113 are formed on the gate insulting film 152 provided with the semiconductor pattern 115 along with the data line 104.

The common line 120 and the common electrode 122 supply a reference voltage for driving the liquid crystal, that is, a common voltage to each pixel.

To this end, the common line 120 includes an internal common line 120A substantially parallel to the gate line 102 at a display area, and an external common line 120B commonly connected to the internal common line 120A at an non-display area. The common electrode 122 is provided within the pixel area to be connected to the internal common line 120A. More specifically, the common electrode 122 includes a horizontal part 122A overlapping the drain electrode 112 adjacent the gate line 102, and a finger part 122B extended from the horizontal part 122A into the pixel area to be connected to the internal common line 120A. The common line 120 and the common electrode 122 have a double-layer structure in which the first conductive layer and second conductive layers 101 and 103 are formed on the substrate 150 along with the gate line 102.

The storage capacitor Cst is provided such that the first horizontal part 122A of the common electrode 122 overlaps with the drain electrode 112 with the gate insulating film 152 therebetween. Herein, the drain electrode 112 is extended from the overlapping portion between it and the thin film transistor TFT, that is, the gate line 102 in such a manner to overlap with the first horizontal part 122A of the common electrode 122 as widely as possible. Thus, a capacitance value of the storage capacitor Cst is increased by the wide overlapping area between the common electrode 122 and the drain electrode 112, so that the storage capacitor Cst allows a video signal charged in the pixel electrode 118 to be stably maintained until a next signal is charged.

The pixel electrode 118 is extended from the drain electrode 112 in such a manner to have a finger shape substantially parallel to the finger part 122B of the common electrode 122. An edge of the pixel electrode 118 is overlapped with the internal common line 120A. The pixel electrode 118 has a double-layer structure in which the third conductive layer and fourth conductive layers 111 and 113 are formed on the gate insulating film 152 similar to the drain electrode 112. Accordingly, if a video signal is applied, via the thin film transistor, to the pixel electrode 118, then a horizontal electric field is formed between the pixel electrode 118 and the finger part 122B of the common electrode 122 supplied with the common voltage. Liquid crystal molecules arranged in the horizontal direction between the thin film transistor array substrate and the color filter array substrate by such a horizontal electric field are rotated due to a dielectric anisotropy. Transmittance of a light transmitting in the pixel area is differentiated depending upon a rotation extent of the liquid crystal molecules, thereby implementing a gray level scale.

Figure 4:
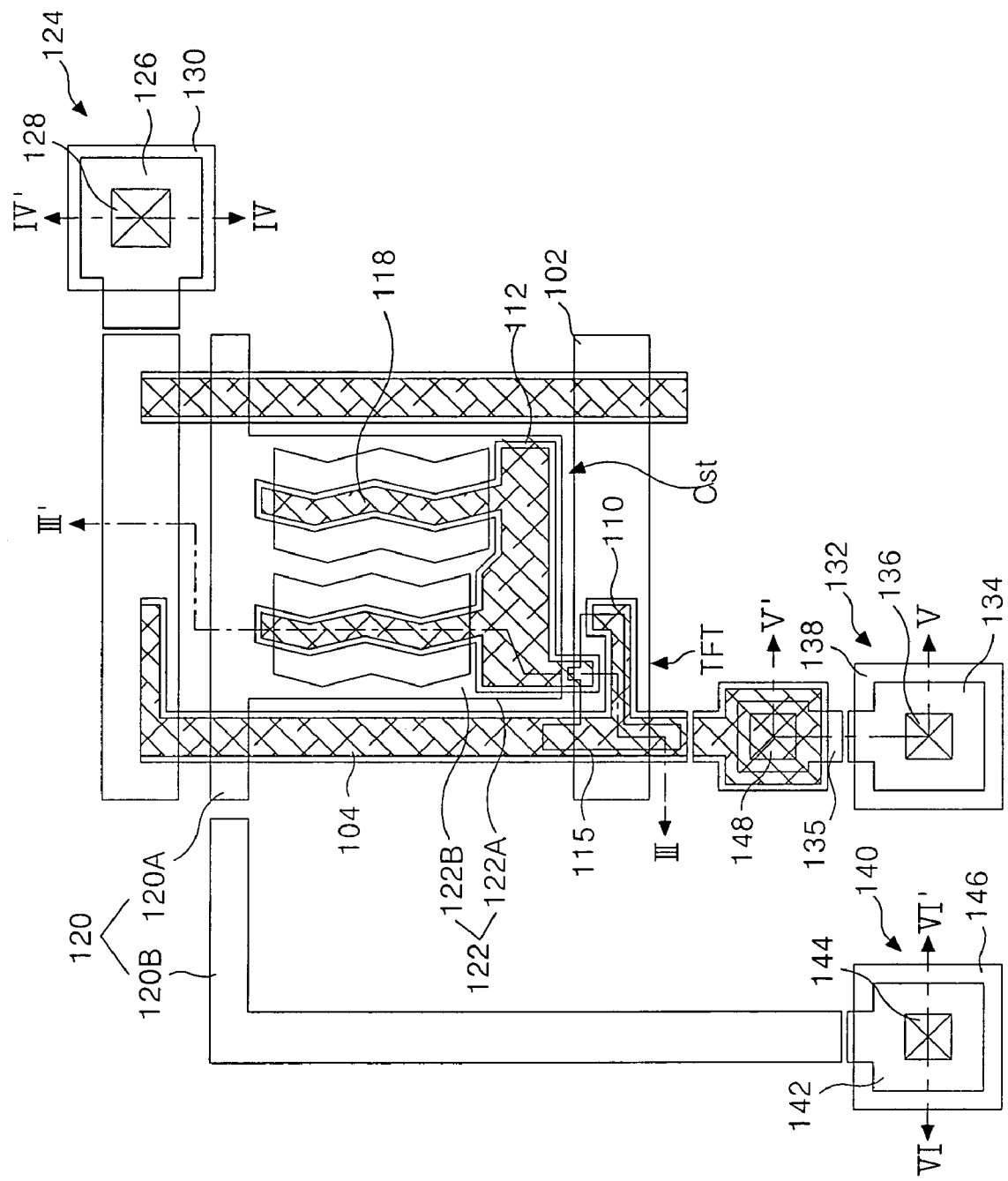
FIG. 4 is a plan view showing a structure of a thin film transistor substrate of a horizontal electric field applying type according to the another embodiment of the present invention.

Further, as shown FIG. 4, the finger part 122B of the common electrode 122 and the finger part 118B of the pixel electrode 118 may be formed in a zigzag manner. In this case, an edge of the finger part 122B of the common electrode 122 adjacent to the data line 104 can be formed substantially parallel to the data line 104 or in a zigzag manner. Alternatively, the data line 104 may be formed in a zigzag manner along the finger part 122B of the adjacent common electrode 122.

The gate line 102 is connected, via the gate pad 124, to the gate driver (not shown). The gate pad 124 consists of a lower gate pad electrode 126 extended from the gate line 102, and an upper gate pad electrode 130 connected, via a first contact hole 128 passing through the gate insulating film 152, to the lower gate pad electrode 126.

The data line 104 is connected, via the data pad 132, to a data driver (not shown). The data pad 132 consists of a lower data pad electrode 134 connected to a data link 135, an upper data pad electrode 138 connected, via a second contact hole 136 passing through the gate insulating film 152, to the lower data pad electrode 134.

The common line 120 receives a reference voltage from a common voltage source (not shown) via the common pad 140. The common pad 140 consists of a lower common pad electrode 142 extended from the external common line 120B, and an upper common pad electrode 146 connected, via a third contact hole 144 passing through the gate insulating film 152, to the lower common pad electrode 142.

In such a thin film transistor substrate according to the embodiment of the present invention, the data pad 132 has the same structure as the gate pad 124 and the common pad 140. More specifically, the lower gate pad electrode 126, the lower common pad electrode 142, the lower data pad electrode 134 and the data link 135 have a double-layer structure in which the first conductive layer and second conductive layers 101 and 103 are formed on the substrate 150 along with the gate line 102. Also, the upper gate pad electrode 130, the upper common pad electrode 146 and the upper data pad electrode 138 are formed on the gate insulating film 152 along with the data line 104, and are formed of the third conductive layer 111 in which the fourth conductive layer 113 is removed, that is, a transparent conductive layer.

The data link 135 is extended from the lower data pad electrode 134 to thereby have a structure in which the first and second conductive layers 101 and 103 are formed. The second conductive layer 103 of the data link 135 is exposed through the fourth contact hole 148 to be connected to the third conductive layer 111 of the data line 104. In this case, the third conductive layer 111 of the data line 104 may be integral to the upper data pad electrode 138. The data line 104 is exposed due to an absence of the protective film. In order to prevent the fourth conductive layer 113 of the data line 104 from being exposed to the exterior thereof and oxidized, as shown FIG. 5, the fourth contact hole 148 is positioned within an area sealed by a sealant 200. Thus, the fourth conductive layer 113 of the data line 104 positioned at the sealed area is protected by a lower alignment film 214 to be formed thereon.

Referring to FIG. 5, a thin film transistor substrate formed with the lower alignment film 214 and a color filter substrate 210 formed with an upper alignment film 212 are joined to each other by the sealant 200, and a cell gap between the two substrates sealed by the sealant 200 is formed with a liquid crystal therebetween. In this case, the liquid crystal may be formed by a liquid crystal dropping method in which a liquid crystal layer is formed by dropping the liquid crystal on at least one substrate and then joining the substrates or a vacuum injection method in which two substrates are joined and then the liquid crystal is injected. The upper and lower alignment films 212 and 214 are formed with an organic insulating material at each picture display area of the two substrates. The sealant 200 is formed with being spaced in such a manner to be not in contact with the upper and lower alignment films 212 and 214 for the purpose of reinforcing an adhesive force. Thus, the data line 104, the source electrode 110, the drain electrode 112, and the pixel electrode 118 provided at the thin film transistor substrate are positioned at an area sealed by the sealant 200, so that it may be sufficiently protected by the lower alignment film 214 formed thereon as well as by the liquid crystal formed in the sealed area.

The thin film transistor substrate of a horizontal electric field applying type according to the first embodiment of the present invention having no protective film as described above is formed by the following three-round mask process.

Figure 6A:
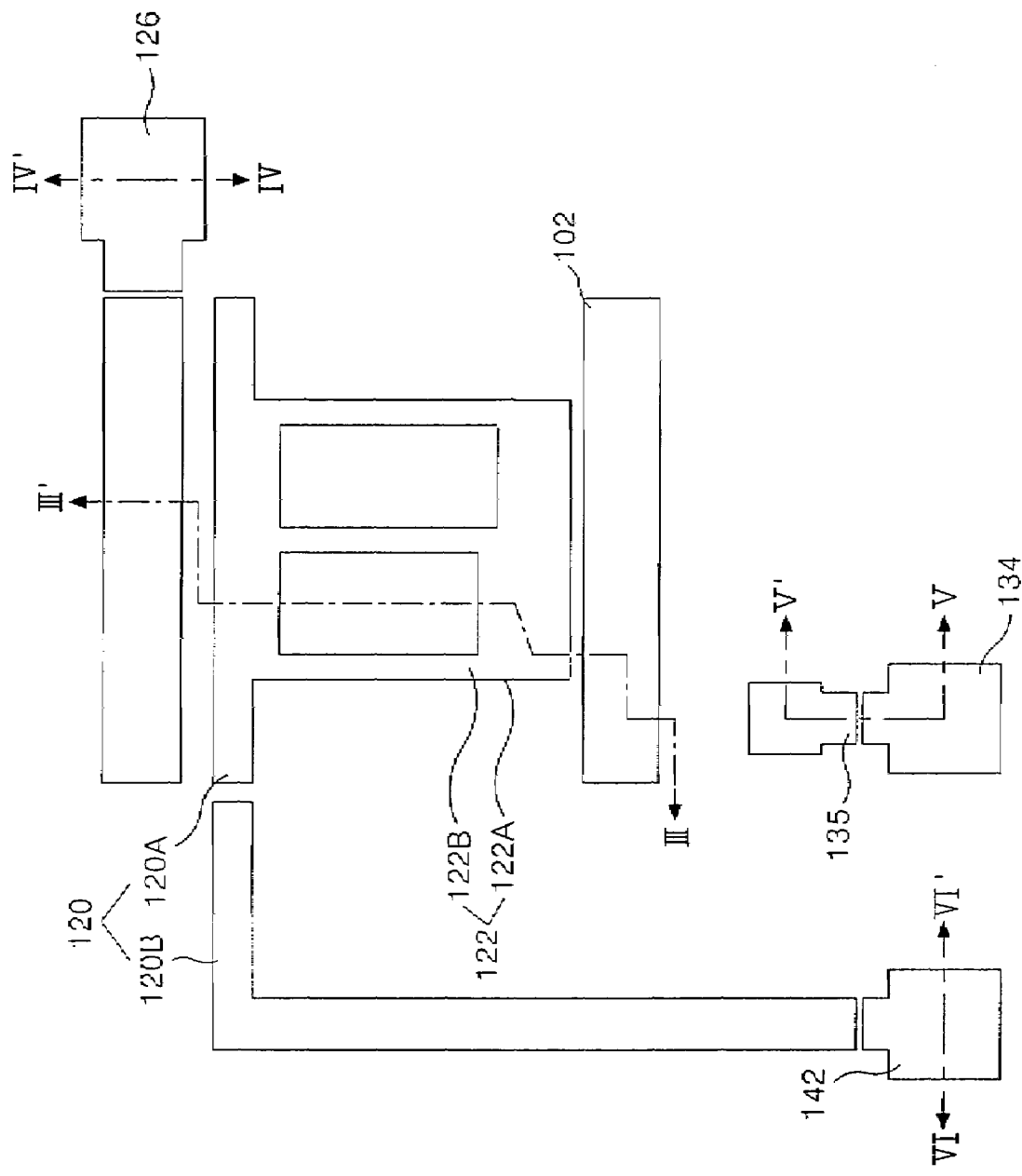
FIG. 6a and FIG. 6b are a plan view and a sectional view explaining a first mask process in a method of fabricating the thin film transistor substrate of a horizontal electric field applying type according to the embodiment of the present invention, respectively.
Figure 6B:
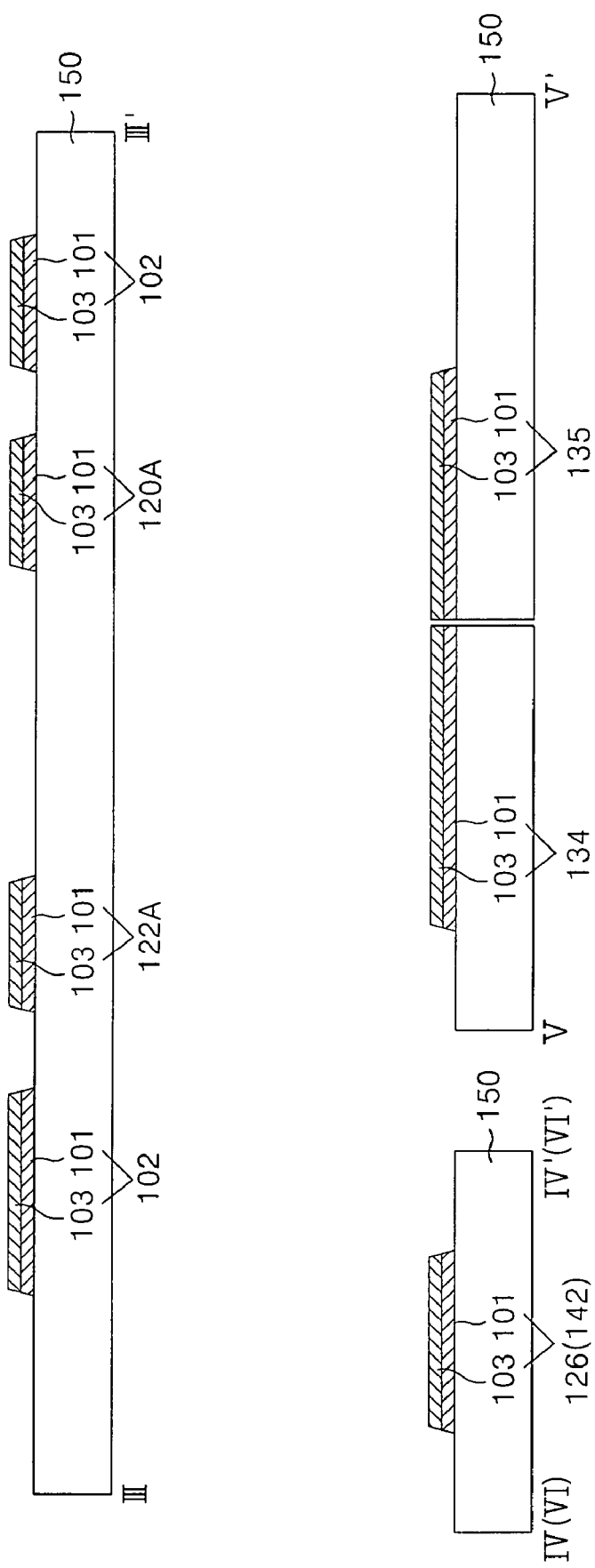

FIG. 6a and FIG. 6b are a plan view and a sectional view explaining a first mask process, respectively, in a method of fabricating the thin film transistor substrate of a horizontal electric field applying type according to the embodiment of the present invention.

A first mask pattern group including the gate line 102, the lower gate pad electrode 126, the common line 120, the common electrode 122, the lower common pad electrode 142, the data link 135 and the lower data pad electrode are formed on the lower substrate 150 by the first mask process. Herein, the first mask pattern group has a multiple-layer structure in which at least two conductive layers are formed. For convenience, only a double-layer structure having the first and second conductive layers 101 and 103 will be explained.

More specifically, the first and second conductive layers 101 and 103 are disposed on the lower substrate 150 by a deposition technique such as the sputtering. The first conductive layer 101 and second conductive layers 103 may employ an Al-alloy such as Mo, Ti, Cu and AlNd, a Mo-alloy such as Al, Cr and MoW, or a metal material such as a Cu-alloy. For example, the first and second conductive layers 101 and 103 may employ a double-layer structure such as Al/Cr, Al/Mo, Al(Nd)/Al, Al(Nd)/Cr, Cu/Mo, Mo/Al, Cu-alloy/Mo, Cu-alloy/Al, Cu-alloy/Mo-alloy, Cu-alloy/Al-alloy, Al/Mo-alloy, Mo-alloy/Al, Al-alloy/Mo-alloy, Mo-alloy/Al-alloy, Mo/Al-alloy. Alternatively, there may be a layered structure of at least triple layers such as Mo/Al(Nd)/Mo, Ti/Al(Nd)/Ti, Mo/Ti/Al(Nd). Next, a first photo-resist pattern is formed on the second conductive layer 101 by photolithography using a first mask. Then, portions of the first and second conductive layers 101 and 103 exposed through the first photo-resist pattern are etched by an etching process, thereby providing the first mask pattern group including a double-layer structure of the gate line 102, the lower gate pad electrode 126, the common line 120, the common electrode 122, the lower common pad electrode 142, the data link 135 and the lower data pad electrode 134.

Figure 7A:
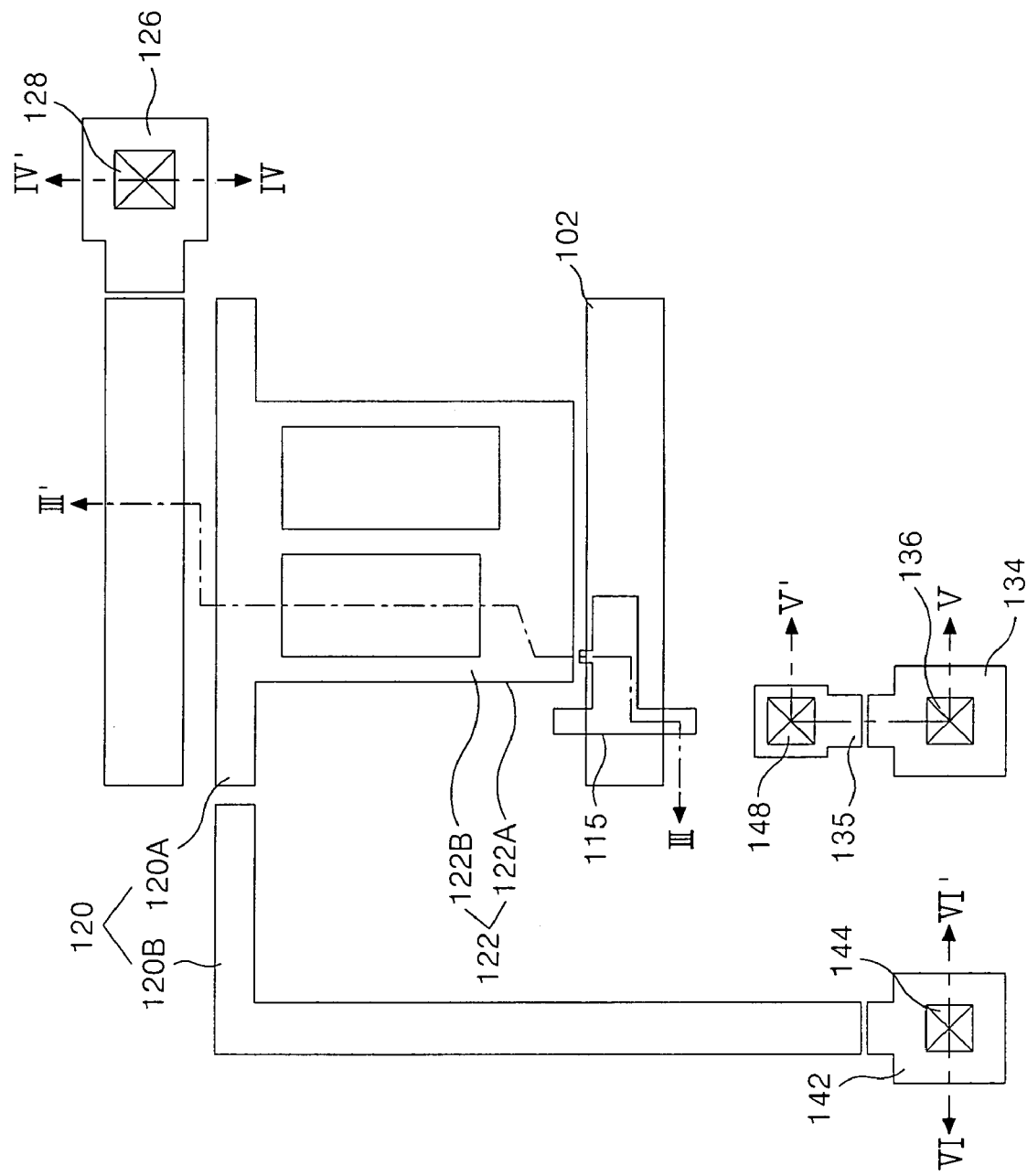

FIG. 7a and FIG. 7b are a plan view and a section view explaining a second mask process in a method of fabricating the thin film transistor substrate of a horizontal electric field applying type according to the embodiment of the present invention, respectively, and FIG. 8a to FIG. 8f are section views more specifically explaining the second mask process.

The gate insulating film 152 including first to fourth contact holes 128, 136, 144 and 148 and the semiconductor pattern 115 are formed on the lower substrate 150 provided with the first mask pattern group by the first mask process. The semiconductor pattern 115 and the contact holes 128, 136, 144 and 148 of the gate insulating film 152 are defined by a single mask process employing a diffractive exposure mask or a half tone mask. Hereinafter, a case where the half tone mask is used as a second mask will be described.

Figure 8A:
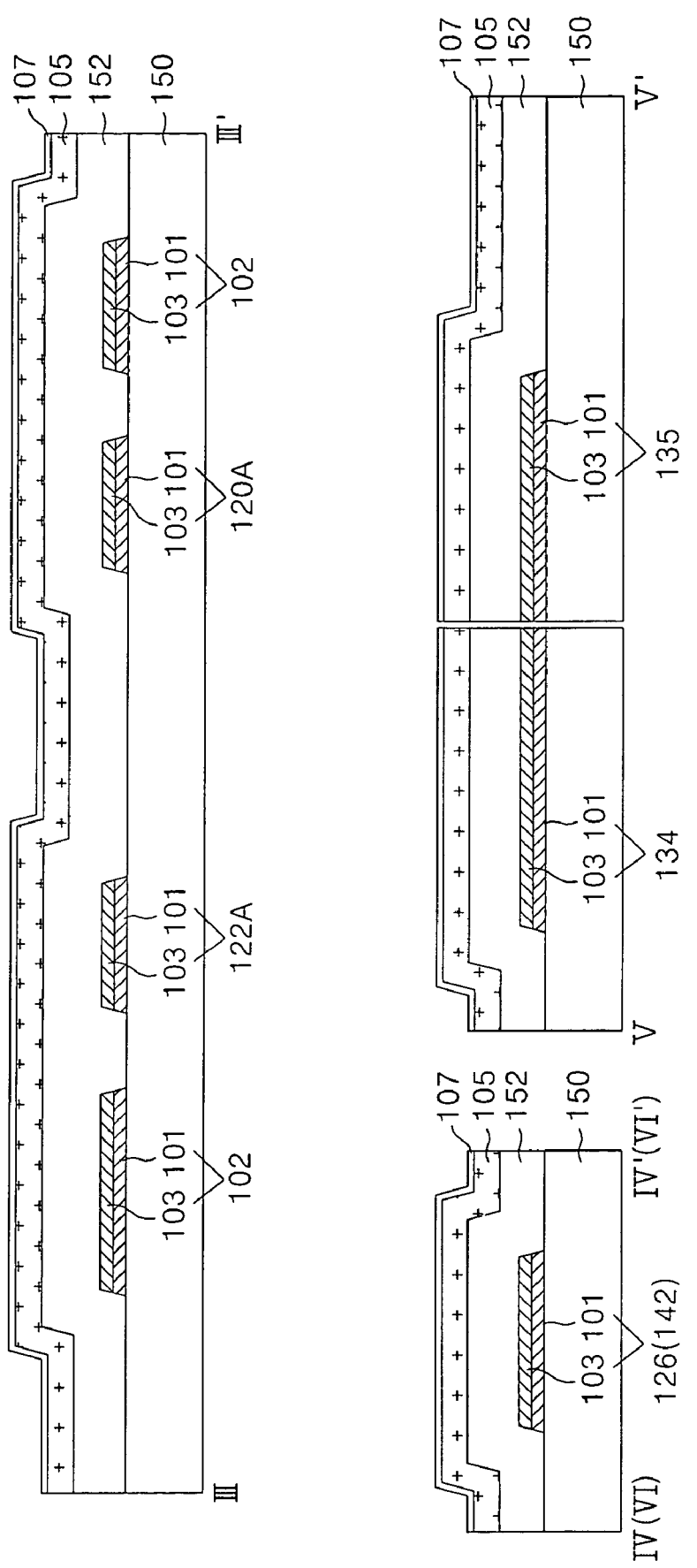

In FIG. 8a, the gate insulating film 152, an amorphous silicon layer 105 and an amorphous silicon layer 107 doped with an $n^+$ or $p^+$ impurity are sequentially disposed on the lower substrate 150 provided with the first mask pattern group by a deposition technique such as the PECVD. The gate insulating film 152 is formed of an inorganic insulating material such as silicon oxide ($SiO_x$) or silicon nitride ($SiN_x$).

In FIG. 8b, a second photo-resist pattern 168 having step coverage is formed by photolithography using a half tone mask. The half tone mask is comprised of a shielding part for shielding an ultraviolet ray, a half-tone transmitting part for partially transmitting the ultraviolet ray using a phase-shifting material, and a full transmitting part for fully transmitting the ultraviolet ray. The second photo-resist pattern 168 includes second photo-resist patterns 168A and 168B having a different thickness and an aperture part formed by photolithography using a half tone mask. In this case, the relatively thick second photo-resist pattern 168A and is provided at a shielding area P1 of the second photo-resist overlapping with the shielding part of the half tone mask; the second photo-resist pattern 168B is thinner than the second photo-resist pattern 168A and is provided at a half tone exposure area P2 overlapping the half-tone transmitting part; and the aperture part is provided at an full exposure area P3 overlapping the full transmitting part.

In FIG. 8c, the first to fourth contact holes 128, 136, 144 and 148 pass through the gate insulating film 152 from the amorphous silicon layer 105 doped with an $n^+$ or $p^+$ impurity 107 are formed by the etching process using the second photo-resist pattern 168 as a mask. The first contact hole 128 exposes the lower gate pad electrode 126; the second contact hole 136 exposes the lower data pad electrode 134; the third contact hole 144 exposes the lower common pad electrode 142; and the fourth contact hole 148 exposes the data link 135.

Figure 8D:
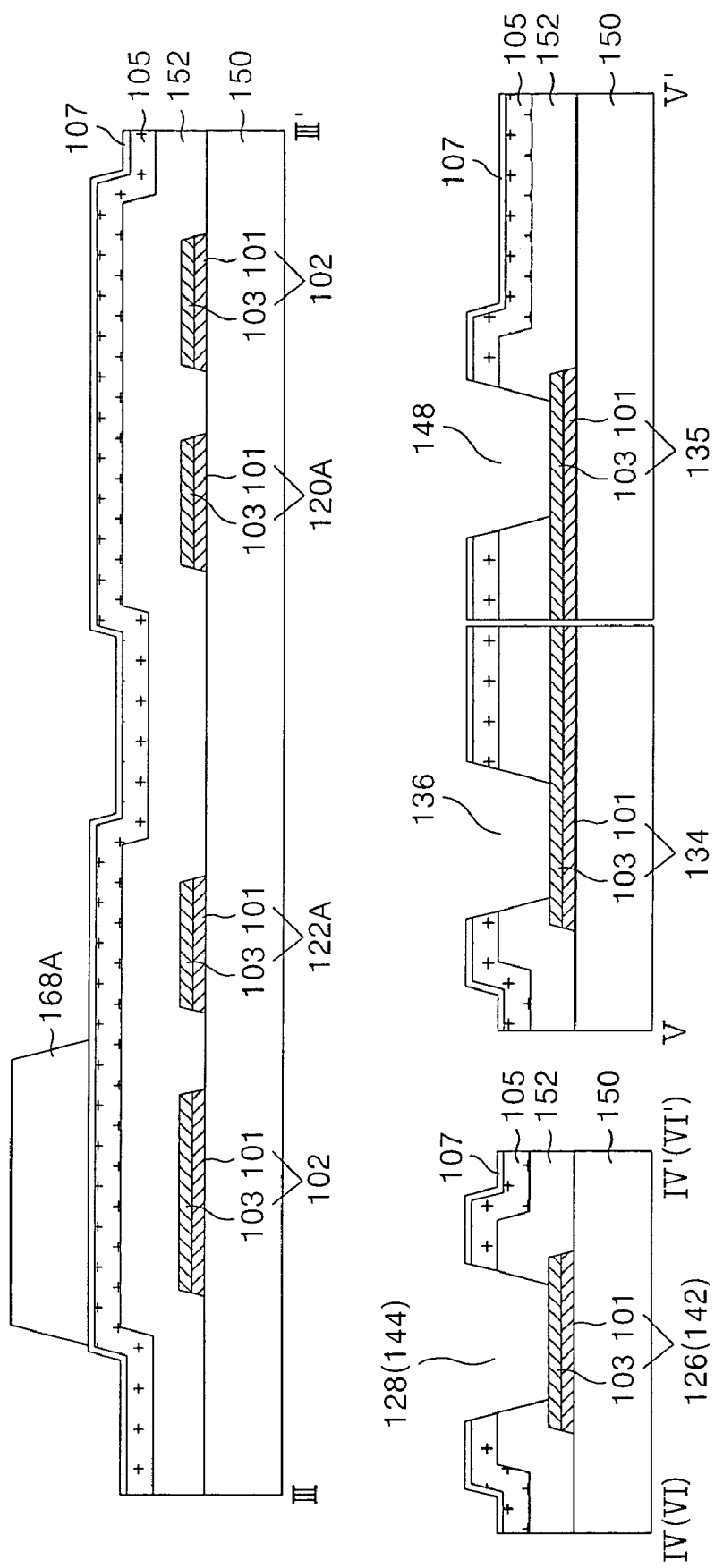

In FIG. 8d, a thickness of the second photo-resist pattern 168A is thinned while the second photo-resist pattern 168B is removed by an ashing process using an oxygen ($O_2$) plasma.

In FIG. 8e, the amorphous silicon doped with an $n^+$ or $p^+$ impurity 107 and the amorphous silicon layer 105 are patterned by the etching process using the ashed second photo-resist pattern 168A as a mask to thereby provide the semiconductor pattern 115 including the active layer 114 and the ohmic contact layer 116.

In FIG. 8f, the second photo-resist pattern 168A left on the semiconductor pattern 115 in FIG. 8e is removed by a stripping process.

Figure 9A:
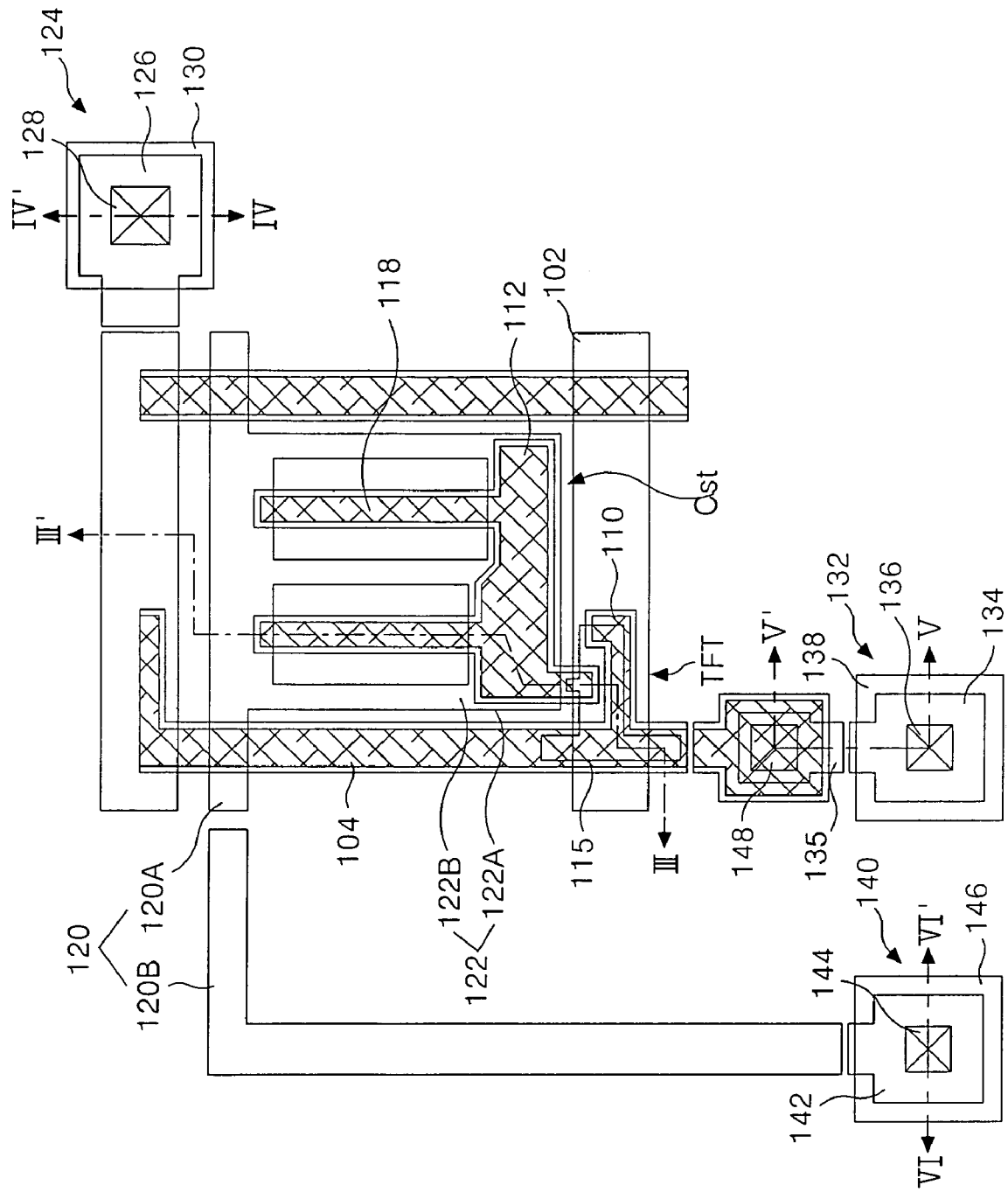

FIG. 9a and FIG. 9b are a plan view and a section view explaining a third mask process in a method of fabricating the thin film transistor substrate of a horizontal electric field applying type according to the embodiment of the present invention, respectively, and FIG. 10a to FIG. 10e are section views more specifically explaining the third mask process.

A third mask pattern group including the data line 104, the source electrode 110, the drain electrode 112, the pixel electrode 118, the upper gate pad electrode 130, the upper data pad electrode 138 and the upper common pad electrode 146 is formed on the gate insulating film 152 provided with the semiconductor pattern 115 by the third mask process. Herein, the third mask pattern group A including the data line 104, the source electrode 110, the drain electrode 112 and the pixel electrode 118 has a multiple-layer structure in which at least two conductive layers are formed. For convenience, only a double-layer structure having the third and fourth conductive layers 111 and 113 formed will be explained. The third mask pattern group B including the upper gate pad electrode 130, the upper data pad electrode 138 and the upper common pad electrode 146 has a single-layer structure formed from the third conductive layer 111 of the third mask pattern group A. The third mask pattern group including the third mask pattern group A having such a double-layer structure and the third mask pattern group B having such a single-layer structure is formed by the third mask process using a diffractive exposure mask or a half tone mask. Hereinafter, a case where the half tone mask is used as a third mask will be described.

Figure 10A:
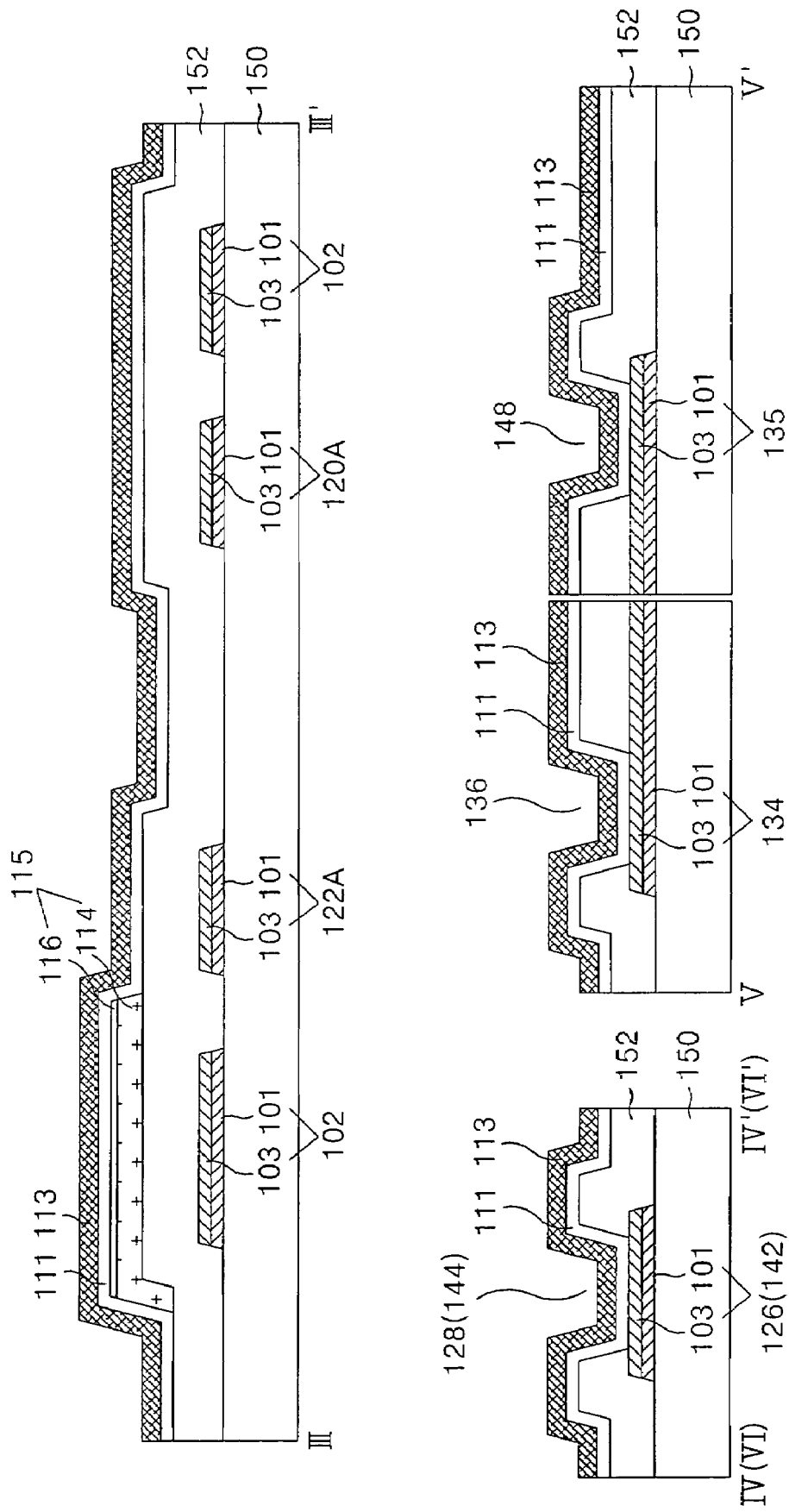
Figure 10C:
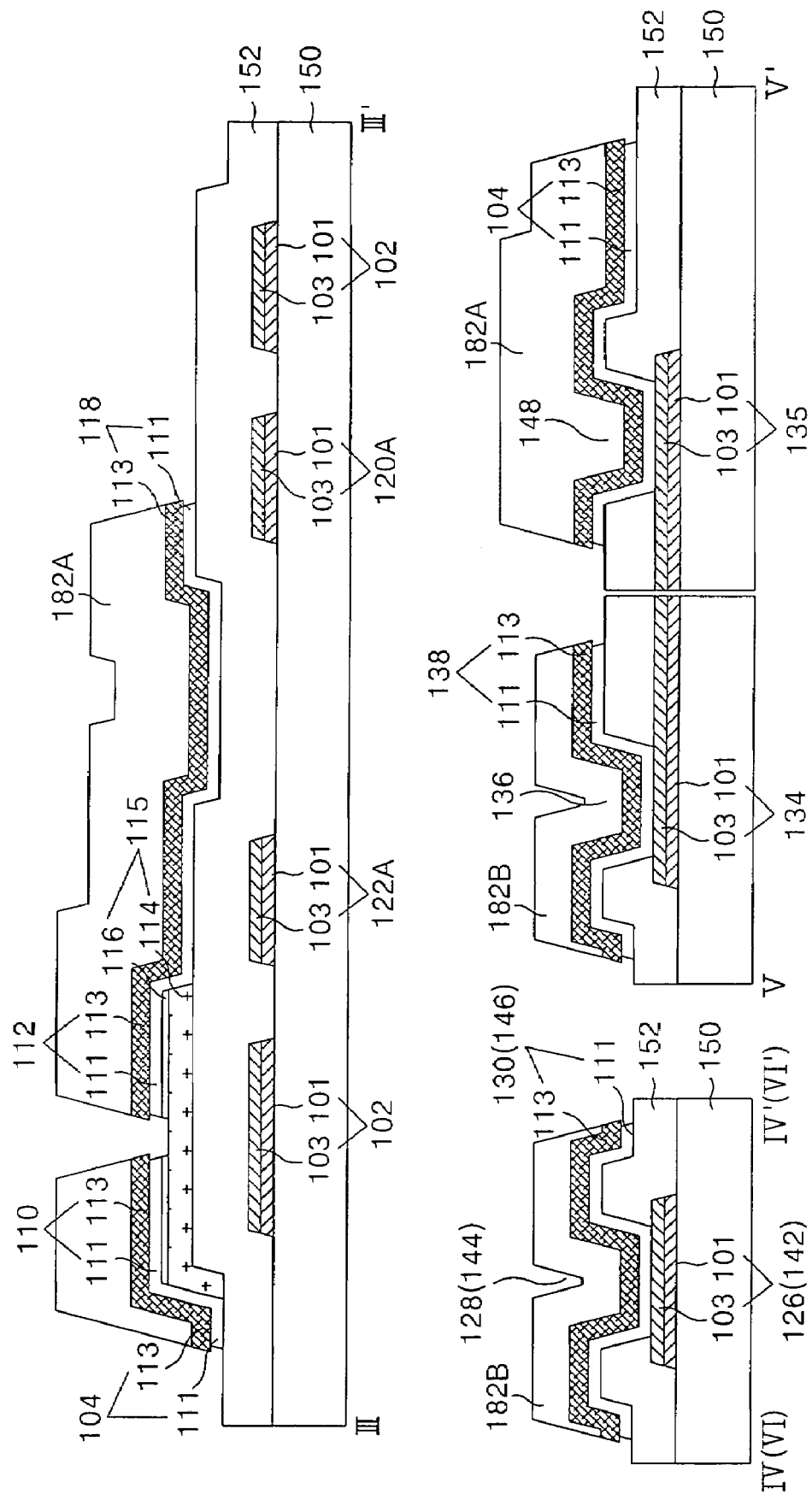

In FIG. 10a, the third and fourth conductive layers 111 and 113 are sequentially formed on the gate insulating film 152 provided with the semiconductor pattern 115 by a deposition technique such as the sputtering. The third conductive layer 111 may be formed of a transparent conductive material such as ITO, TO, IZO or ITZO, or an opaque metal having a strong corrosion resistance and a high strength such as Ti or W. The fourth conductive layer 113 employs a single layer formed of a metal material such as Mo, Ti, Cu, AlNd, Al, Cr, a Mo-alloy, a Cu-alloy or an Al-alloy, or may have a layered structure of at least double layers such as Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al(Nd), Cu-alloy/Mo, Cu-alloy/Al, Cu-alloy/Mo-alloy, Cu-alloy/Al-alloy, Al/Mo-alloy, Mo-alloy/Al, Al-alloy/Mo-alloy, Mo-alloy/Al-alloy, Mo/Al-alloy.

In FIG. 10b, a third photo-resist pattern 182 having step coverage is formed by the photolithography using a half tone mask. The half tone mask is comprised of a shielding part for shielding an ultraviolet ray, a half-tone transmitting part for partially transmitting the ultraviolet ray using a phase-shifting material, and a full transmitting part for fully transmitting the ultraviolet ray. The third photo-resist pattern 182 includes third photo-resist patterns 182A and 182B having a different thickness and an aperture part formed by photolithography using a half tone mask. In this case, the relatively thick third photo-resist pattern 182A is provided at a shielding area P1 of the third photo-resist overlapping with the shielding part of the half tone mask; the third photo-resist pattern 182B is thinner than the third photo-resist pattern 182A and is provided at a half tone exposure area P2 overlapping the half-tone transmitting part; and the aperture part is provided at an full exposure area P3 overlapping with the full transmitting part.

The fourth and third conductive layer 113 and 111 are etched by a different etchant, the third conductive layer 111 positioned at a portion lower than the upper fourth conductive layer 113 is over-etched to cause an under-cut area. Further, the ohmic contact layer 116 between the source electrode 110 and the drain electrode 112 is removed by an etching process using the source electrode 110 and the drain electrode 112 as a mask, for example, a dry-etching process, to thereby expose the active layer 114. In this case, an edge of the separated ohmic contact layer 116 has a more protruded shape than the third conductive layer 111 edges of the source electrode 110 and the drain electrode 112.

Figure 10D:
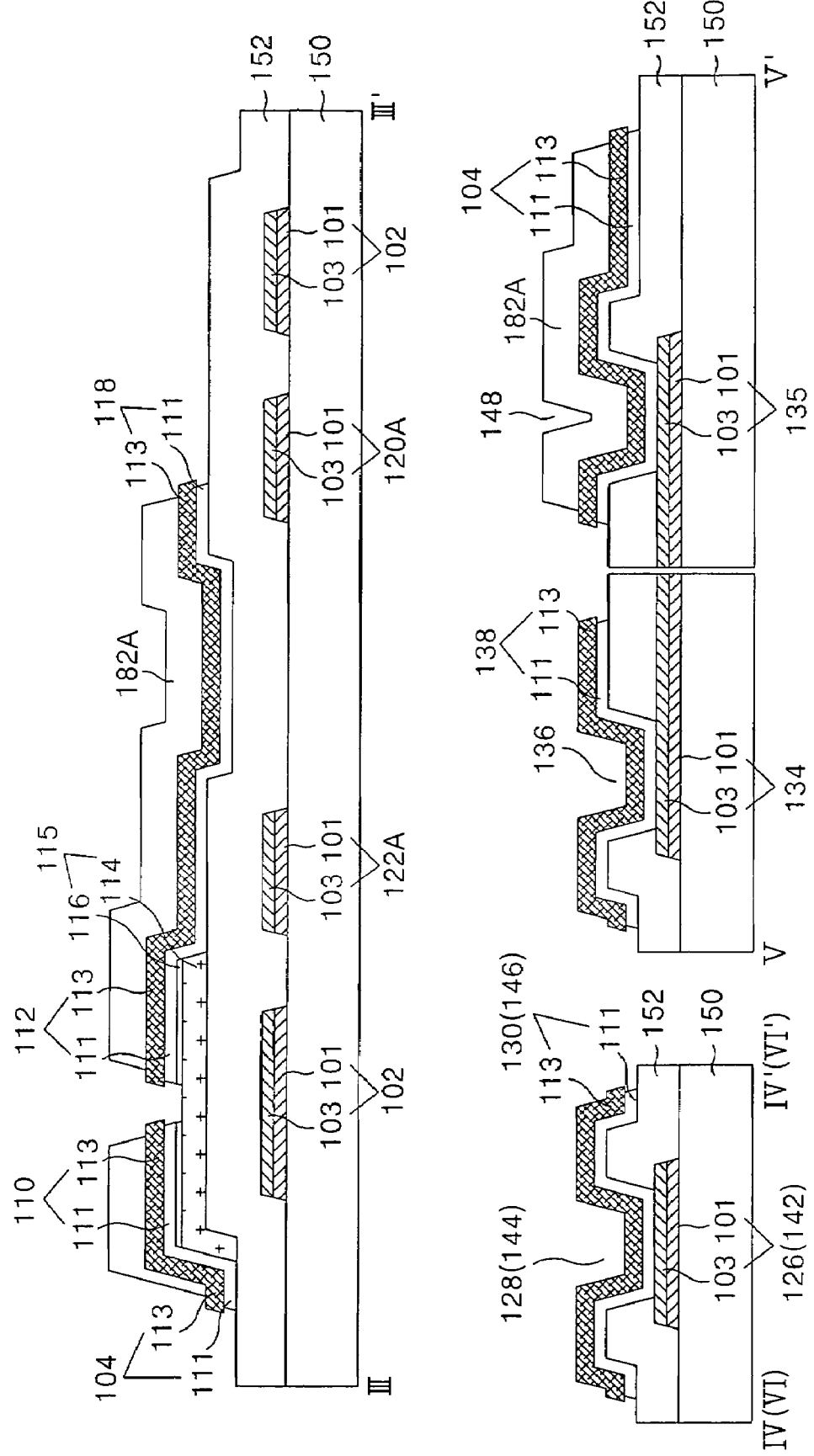

In FIG. 10d, a thickness of the third photo-resist pattern 182A is thinned and the third photo-resist pattern 182B is removed by an ashing process. Such a removal of the third photo-resist pattern 182B exposes the fourth conductive layer 113 of the upper gate pad electrode 130, the upper data pad electrode 138 and the upper common pad electrode 146. Further, the edge of the ashed third photo-resist pattern 182A is positioned at an inner side of the edge of the patterned fourth conductive layer 113.

Figure 10E:
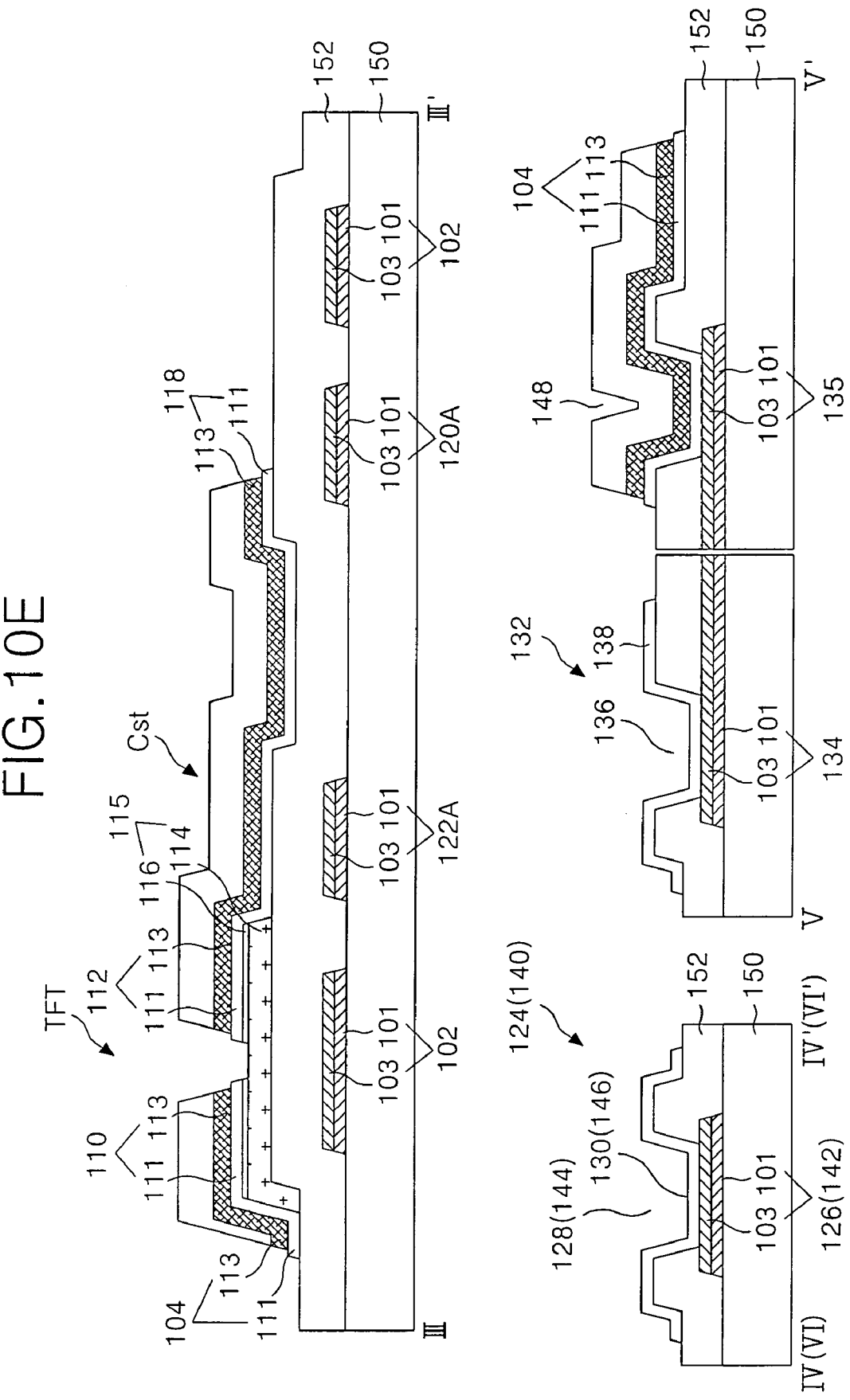

In FIG. 10e, the fourth conductive layer 113 of the upper gate pad electrode 130, the upper data pad electrode 138 and the upper common pad electrode 146 are etched by the etching process using the ashed third photo-resist pattern 182A as a mask to thereby provide the upper gate pad electrode 130, the upper data pad electrode 138 and the upper common pad electrode 146 that have a single-layer structure of the third conductive layer 111. In this case, each side of the fourth conductive layer 113 exposed through the edge of the third photo-resist pattern 182A is again etched. Thus, the third and fourth conductive layers 111 and 113 of the data line 104, the source electrode 110, the drain electrode 112 and the pixel electrode 118 have a constant step coverage having a stepwise shape. Further, the edge of the ohmic contact layer 116 at the channel portion of the thin film transistor TFT may be more protruded than those of the source electrode 110 and the drain electrode 112 to thereby provide the ohmic contact layer 118 and the third and fourth conductive layers 111 and 113 with step coverage taking a stepwise shape. And the third photo-resist pattern 182A is removed by s stripping process.

The etching process of the third and fourth conductive layers 111 and 113 in the third mask process may be performed by wet-etching or dry-etching. But, the wet-etching is preferable.

As a result, the thin film transistor substrate of a horizontal electric field applying type according to the embodiment of the present invention has an exposed structure of the data line 104, the source electrode 110, and the pixel electrode 118 due to an absence of the protective film. However, all of these are positioned at an area sealed by the sealant, so that they may be sufficiently protected by the lower alignment film formed thereon as well as by the liquid crystal formed in the sealed area.

As described above, in the thin film transistor substrate of a horizontal electric field applying type according to the present invention, the semiconductor pattern and the contact holes are formed by utilizing the first half tone (or diffractive exposure) mask.

Moreover, in the thin film transistor substrate of a horizontal electric field applying type according to the present invention, a single-layer structure of upper pad electrodes are formed, along with a multiple-layer structure of other third mask pattern group, without any protective film with the aid of the second half tone (or diffractive exposure) mask.

Accordingly, in the thin film transistor substrate of a horizontal electric field applying type according to the present invention, the entire process can be simplified by the three-round mask process, so that it becomes possible to reduce the material costs and the equipment investment costs as well as to improve productivity.

Furthermore, the liquid crystal panel to which the thin film transistor-substrate of a horizontal electric field applying type according to the present invention is applied, allows the data line, the source electrode, the drain electrode and the pixel electrode to be exposed due to an absence of the protective film to sufficiently protect the lower alignment film formed thereon or by the liquid crystal formed in the area sealed by the sealant. Also, the pads of the thin film transistor substrate have the same structure, and the data link connected to the data pad is connected, via the contact hole, to the data line within the area sealed by the sealant. Thus, it becomes possible to prevent an illumination problem, etc. caused by the absence of the protective film.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
   a first mask process of forming a first mask pattern group including a gate line, a gate electrode connected to the gate line, a common line substantially parallel to the gate line, a common electrode connected to the common line on a first substrate;
   a second mask process of forming a gate insulating film on the first mask pattern group and forming a semiconductor pattern on the gate insulating film; and
   a third mask process of forming a third mask pattern group including a data line crossing the gate line and the common line, a source electrode connected to the data line, a drain electrode opposite the source electrode and a pixel electrode connected to the drain electrode from a first conductive layer group having at least double conductive layers on the gate insulating film, wherein the third mask pattern group is formed in an area to be sealed by a sealant upon joining the first substrate and a second substrate;

wherein the first mask process includes forming a lower pad electrode to be connected to at least one of the gate line, the data line and the common line, the second mask process includes forming a contact hole passing through the gate insulating film to expose the lower pad electrode, and the third mask process includes forming an upper pad electrode to be connected, via the contact hole, to the lower pad electrode from at least one conductive layer of the first conductive layer group.

2. The method as claimed in claim 1, further comprising forming an alignment film on the third mask pattern group.

3. The method as claimed in claim 2, wherein the first mask process includes forming a data link extended from the lower pad electrode and overlapping the data line on the first substrate, and wherein the second mask process includes forming a second contact hole for connecting the data link with the data line.

4. The method as claimed in claim 3, wherein the second contact hole is formed in an area to be sealed by a sealant upon joining the first and second substrates.

5. The method as claimed in claim 3, wherein the second contact hole is formed under the alignment film.

6. The method as claimed in claim 1, wherein the second mask process further includes:

forming a gate insulating film on the first mask pattern group, and an amorphous silicon layer, and an amorphous silicon layer doped with an impurity;

forming photo-resist patterns having a different thickness by photolithography using one of a half tone mask and a diffractive exposure mask; and forming contact holes, and the semiconductor pattern having the active layer and the ohmic contact layer by an etching process using the photo-resist patterns.

7. The method as claimed in claim 1, wherein the third mask process includes:

forming the first conductive layer group on the gate insulating film provided with the semiconductor pattern;

forming photo-resist patterns having a different thickness using one of a half tone mask and a diffractive exposure mask;

forming the third mask pattern group having the upper pad electrode by patterning the first conductive layer group by an etching process using the photo-resist pattern;

removing the ohmic contact layer exposed between the source electrode and the drain electrode; and etching the upper pad electrode to a lowermost layer by an etching process using the photo-resist pattern.

8. The method as claimed in claim 7, wherein the lowermost layer of the first conductive layer group includes one of a transparent conductive layer, Ti and W.

9. The method as claimed in claim 7, wherein the ohmic contact layer formed of the active layer with a channel and edges of the source electrode and the drain electrode have step coverage having a stepwise shape.

10. The method as claimed in claim 1, further comprising:

forming a storage capacitor by overlapping the drain electrode with a portion of the common electrode with the gate insulating film therebetween.

11. The method as claimed in claim 1, wherein the first mask pattern group is formed of a second conductive layer group having at least double conductive layers.

12. The method as claimed in claim 11, wherein the lowermost layer of the first conductive layer group includes a transparent conductive layer, and an uppermost layer of the second conductive layer group includes a metal having a low contact resistance such as Mo.

13. The method as claimed in claim 11, further comprising:

after the lowermost layer of the first conductive layer group is over-etched in comparison to the upper layer thereof when the first conductive group is patterned, etching each side of the upper layer exposed through the photo-resist patterns to locate an edge of the upper layer at an inner side of the lowermost layer.

14. The method as claimed in claim 11, wherein the first conductive group has step coverage having a stepwise shape.

* * * * *